(12) United States Patent
Takano

(10) Patent No.: US 8,730,510 B2
(45) Date of Patent: May 20, 2014

(54) IMAGE INPUT SYSTEM, SERVER IN SYSTEM, CONTROL METHOD THEREFOR, AND STORAGE MEDIUM STORING CONTROL PROGRAM THEREFOR

(75) Inventor: Shinichi Takano, Yokohama (JP)

(73) Assignee: Canon Kabushiki Kaisha (JP)

( * ) Notice: Subject to any disclaimer, the term of this patent is extended or adjusted under 35 U.S.C. 154(b) by 167 days.

(21) Appl. No.: 13/483,174

(22) Filed: May 30, 2012

(65) Prior Publication Data

US 2012/0307300 A1    Dec. 6, 2012

(30) Foreign Application Priority Data

Jun. 1, 2011  (JP) ................................. 2011-123640

(51) Int. Cl.
*G06F 3/12* (2006.01)

(52) U.S. Cl.
USPC .................... 358/1.15; 358/1.14; 358/1.13

(58) Field of Classification Search
CPC .... H04L 67/04; H04L 63/205; H04N 1/3255; G06Q 10/06; H04B 1/00222
USPC .............. 358/1.15, 1.14, 1.13, 1.16
See application file for complete search history.

(56) References Cited

U.S. PATENT DOCUMENTS

| | | | |
|---|---|---|---|
| 2003/0055866 A1* | 3/2003 | Leclair et al. | 709/201 |
| 2005/0105129 A1* | 5/2005 | Takahashi | 358/1.15 |
| 2008/0130038 A1* | 6/2008 | Igarashi | 358/1.15 |
| 2011/0063655 A1* | 3/2011 | Tian | 358/1.15 |
| 2012/0311452 A1* | 12/2012 | Takano | 715/738 |

FOREIGN PATENT DOCUMENTS

JP       2000148649 A     5/2000

* cited by examiner

*Primary Examiner* — Dennis Dicker
(74) *Attorney, Agent, or Firm* — Rossi, Kimms & McDowell LLP

(57) ABSTRACT

An image input system capable of applying to a system using a cloud computing and of selecting the optimal transmission route. The image input system comprises a server, an information processing apparatus that communicates with the server via the Internet, and image input apparatuses communicate with the information processing apparatus via a local network and communicate with the server via the Internet. The server acquires the transmission capacity information of the image input apparatuses searched, selects a first route that directly transmit to the server or a second route that transmit to the server via the image processing apparatus based on the transmission capacity information, and transmits a job message to the information processing apparatus. The information processing apparatus transmits the job message to the image input apparatus selected. Each of the image input apparatuses generates the image information and transmits it to the server.

7 Claims, 14 Drawing Sheets

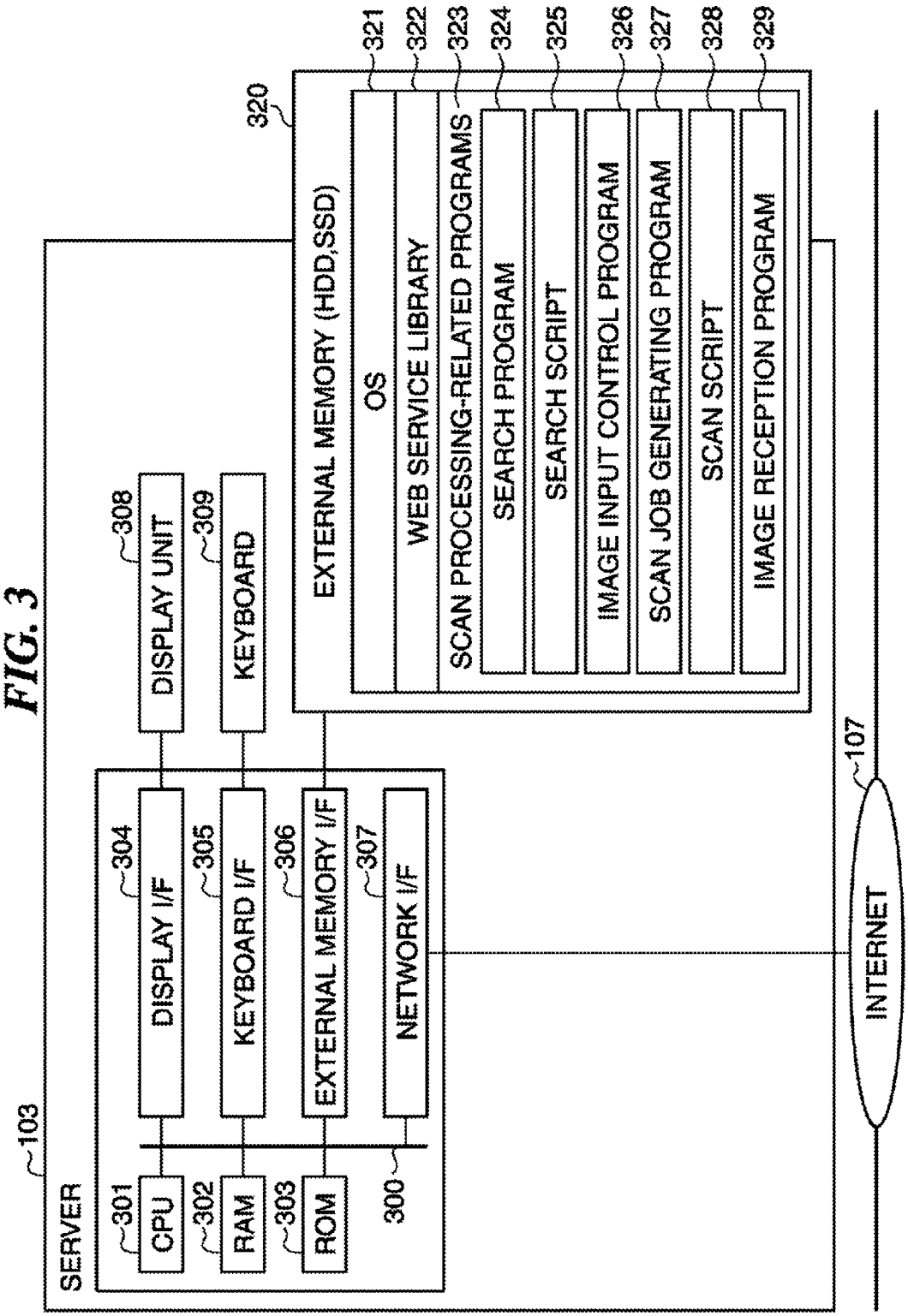

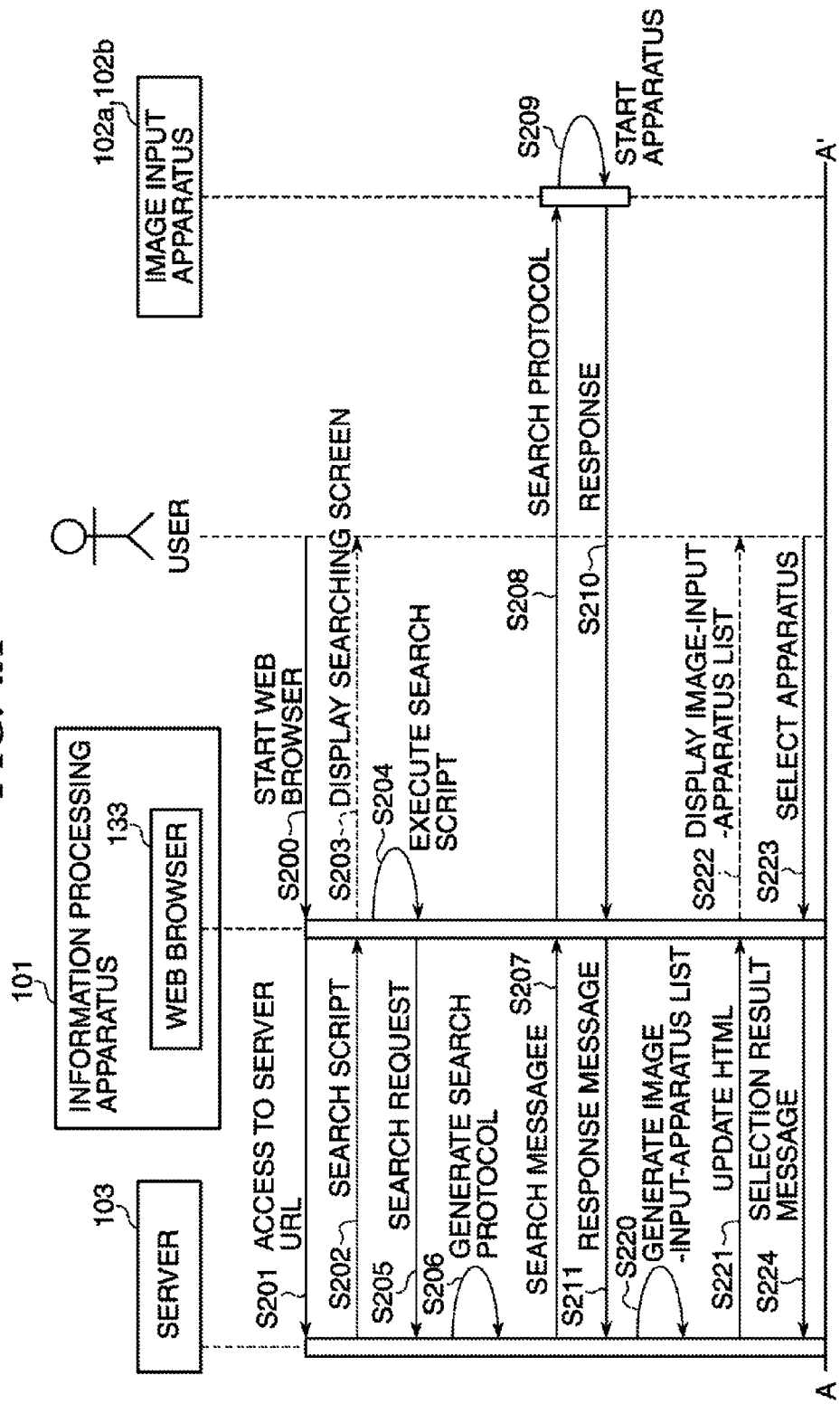

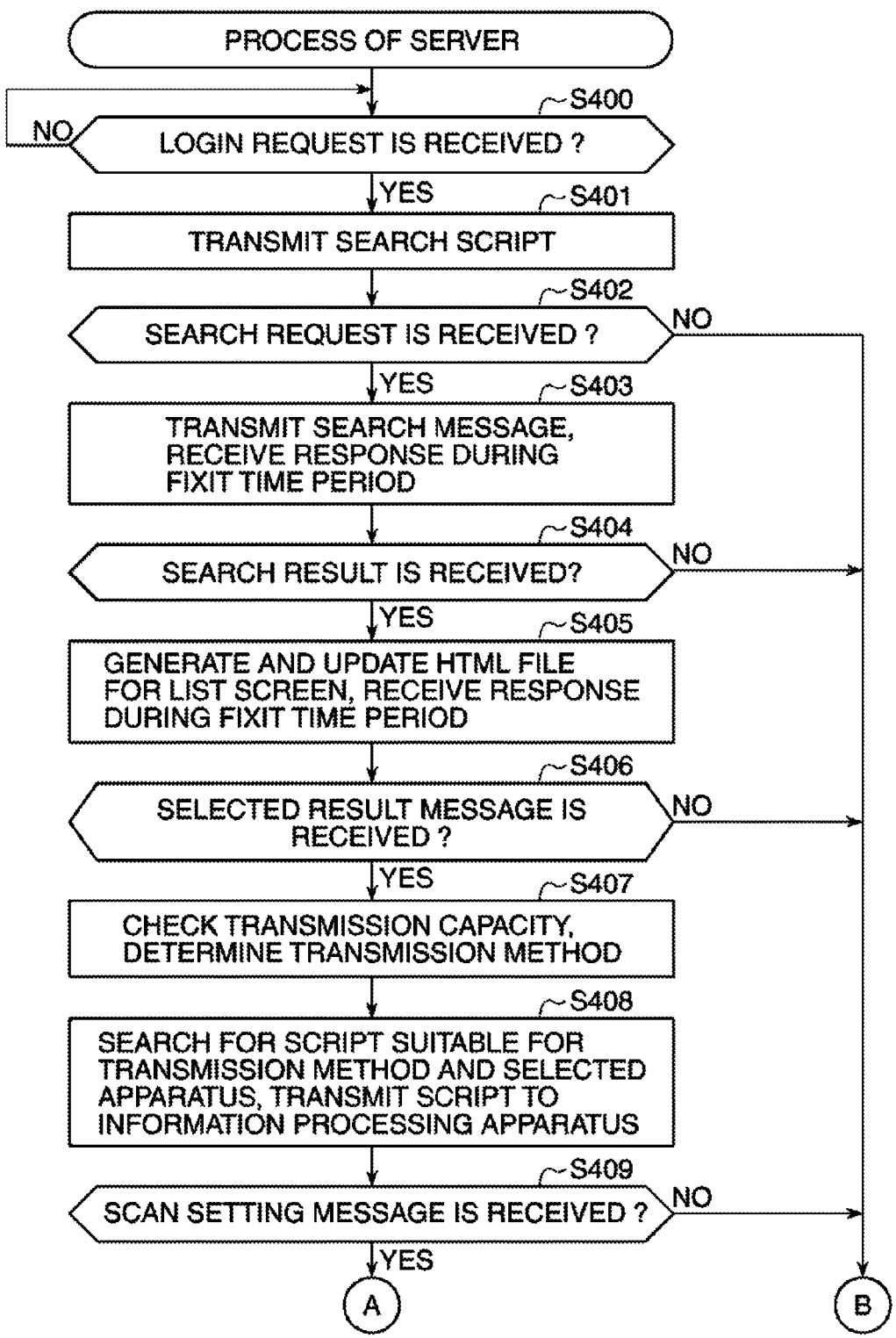

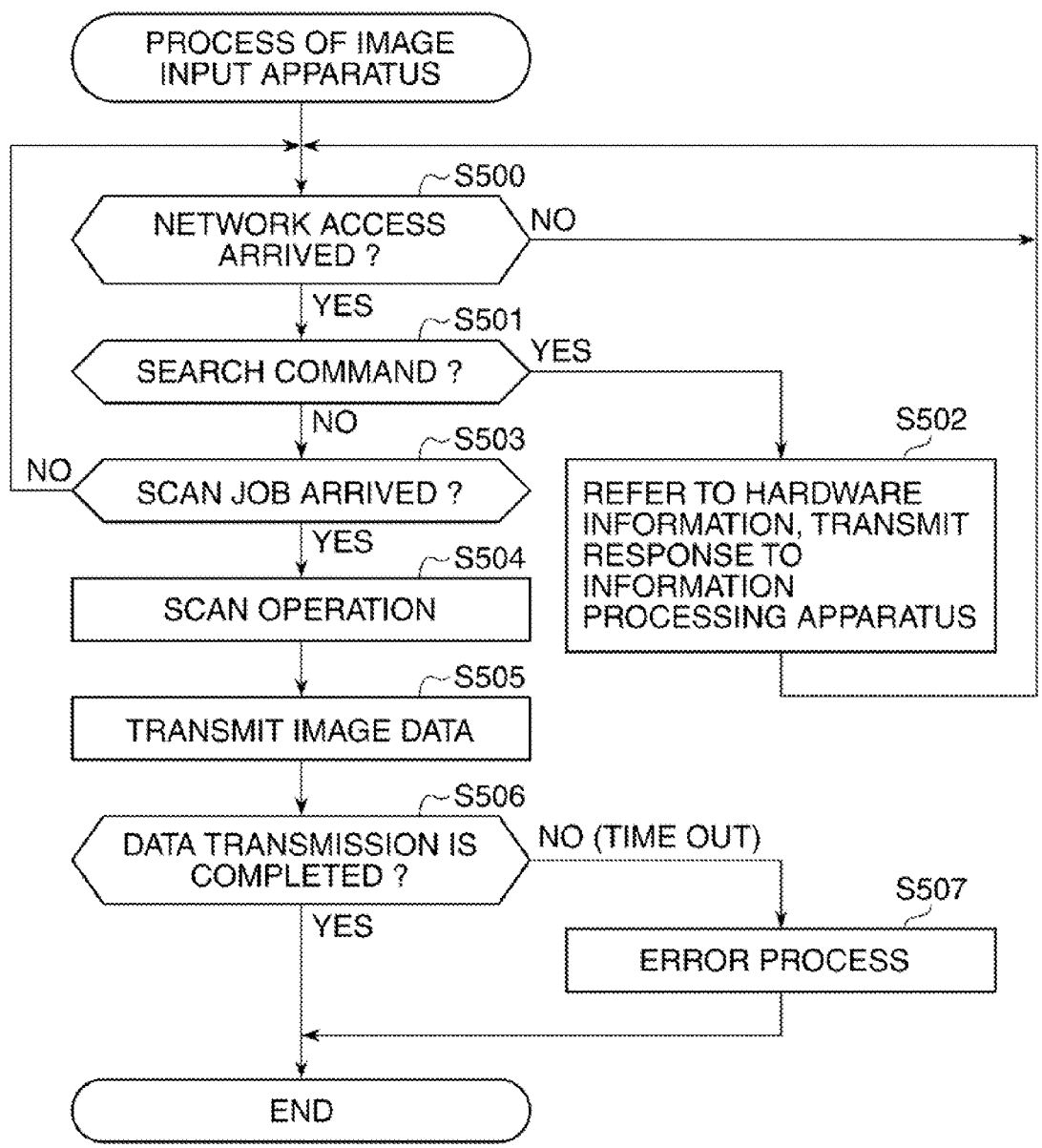

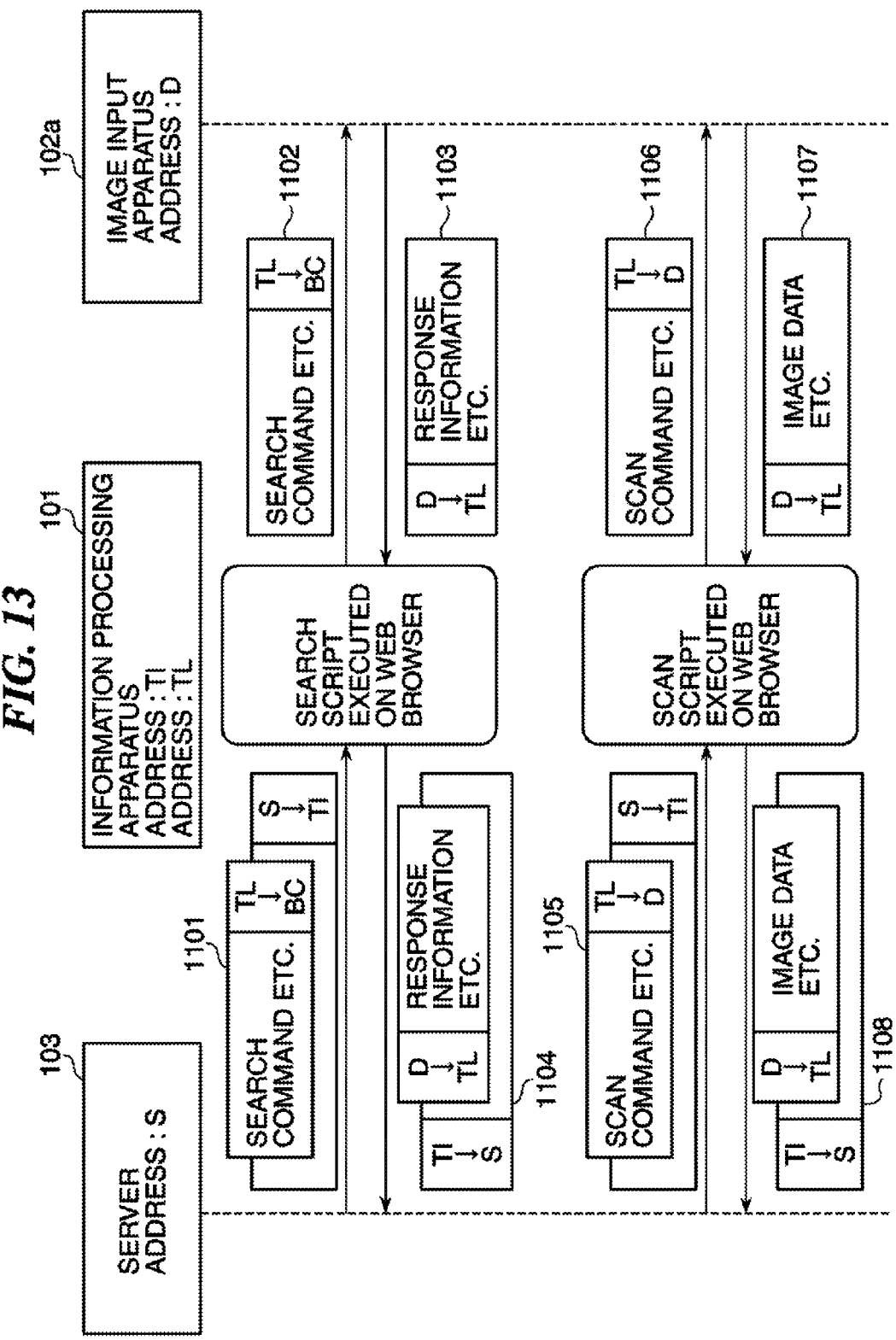

IMAGE INPUT SYSTEM, SERVER IN SYSTEM, CONTROL METHOD THEREFOR, AND STORAGE MEDIUM STORING CONTROL PROGRAM THEREFOR

BACKGROUND OF THE INVENTION

1. Field of the Invention

The present invention relates to an image input system that operates an image input apparatus by accessing to a server on a network via a web browser of an information processing apparatus, the server in the system, a control method therefor, and a storage medium storing a control program therefor.

2. Description of the Related Art

This kind of image input system is disclosed in Japanese Laid-Open Patent Publication (Kokai) No. 2000-148649 (JP 2000-148649A), for example. In the image input system disclosed in this publication, when a client (an information processing apparatus) accesses a server that is directly connected with an image input apparatus via a network, the server returns a general purpose program that creates an interface in a web browser of the client to the client. The interface created by the general purpose program enables a user to operate the image input apparatus from the web browser on the client via the server.

However, since the image input system using the web browser disclosed in the above-mentioned publication needs the server that is connected to the image input apparatus within the local network, it is inapplicable to a system in which an image is uploaded to a server on the Internet using cloud computing, as-is. Since the transmission route of the inputted image data is limited to the route transmitted to the client that is operated by the user via the server, it is not suitable for use of an information processing device that cannot secure sufficient memory space to receive images like a personal digital assistant.

When an information processing apparatus is connected to a server via a mobile phone line network, the load of communication process increases significantly even if the memory space is enough, which may enlarge user's economical load.

SUMMARY OF THE INVENTION

The present invention provides an image input system that is capable of applying to the system using the cloud computing and of selecting the optimal transmission route according to the transmission capacity information of an information processing apparatus.

Accordingly, a first aspect of the present invention provides an image input system comprising a server, an information processing apparatus configured to communicate with the server via the Internet, and image input apparatuses configured to communicate with the information processing apparatus via a local network, and to communicate with the server via the Internet. The server comprises an acquisition unit configured to acquire transmission capacity information of the image input apparatuses searched by a search request from the information processing apparatus to search the image input apparatuses, a selection unit configured to select a transmission route through which image information generated by an image input apparatus selected by the information processing apparatus from among the image input apparatuses searched, from among a first route that directly transmit image information to the server and a second route that transmit image information to the server via the image processing apparatus based on the transmission capacity information, and a job message transmission unit configured to transmit a job message that makes the selected image input apparatus generate image information and execute transmission of the image information through the transmission route selected by the selection unit to the information processing apparatus. The information processing apparatus comprises a job transmission unit configured to transmit the job message to the image input apparatus selected as a job command. Each of the image input apparatuses comprises an execution unit configured to generate the image information and to transmit it to the server according to the job command.

Accordingly, a second aspect of the present invention provides a server that communicates with an information processing apparatus via a wireless communication network and the Internet, communicates with image input apparatuses via the Internet, and stores image information generated by the image input apparatuses, comprising an acquisition unit configured to acquire transmission capacity information of the image input apparatuses searched by a search request from the information processing apparatus to search the image input apparatuses, a selection unit configured to select a transmission route through which image information generated by an image input apparatus selected by the information processing apparatus from among the image input apparatuses searched, from among a first route that directly transmit image information to the server and a second route that transmit image information to the server via the image processing apparatus based on the transmission capacity information, and a job message transmission unit configured to transmit a job message that makes the selected image input apparatus generate the image information and execute transmission of the image information through the transmission route selected by the selection unit to the information processing apparatus.

Accordingly, a third aspect of the present invention provides a control method for a server that communicates with an information processing apparatus via a wireless communication network and the Internet, communicates with image input apparatuses via the Internet, and stores image information generated by the image input apparatuses, the control method comprising an acquisition step of acquiring transmission capacity information of the image input apparatuses searched by a search request from the information processing apparatus to search the image input apparatuses, a selection step of selecting a transmission route through which image information generated by an image input apparatus selected by the information processing apparatus from among the image input apparatuses searched, from among a first route that directly transmit image information to the server and a second route that transmit image information to the server via the image processing apparatus based on the transmission capacity information, and a job message transmission step of transmitting a job message that makes the selected image input apparatus generate the image information and execute transmission of the image information through the transmission route selected by the selection unit to the information processing apparatus.

Accordingly, a fourth aspect of the present invention provides a non-transitory computer-readable storage medium storing a control program causing a computer to execute the control method of the third aspect.

According to the present invention, the image information can be transmitted to the server on the Internet using cloud computing through the optimal transmission route according to the transmission capacity information of the information processing apparatus.

Further features of the present invention will become apparent from the following description of exemplary embodiments with reference to the attached drawings.

BRIEF DESCRIPTION OF THE DRAWINGS

FIG. 3 is a block diagram schematically showing a configuration of a server with which the image input system shown in FIG. 1 is provided.

FIG. 4A and FIG. 4B are sequential charts of a scan process in the image input system in FIG. 1.

FIG. 6A and FIG. 6B are flowcharts showing a process of the server in the scan process executed by the image input system in FIG. 1.

FIG. 7 is a flowchart showing a process of the image input apparatus in the scan process executed by the image input system in FIG. 1.

FIG. 13 is a schematic diagram showing contents of data transmission and reception and an example of the process when a search script and a scan script of the server are executed by the information processing apparatus.

DESCRIPTION OF THE EMBODIMENTS

Hereafter, embodiments according to the present invention will be described in detail with reference to the drawings.

Figure 1:
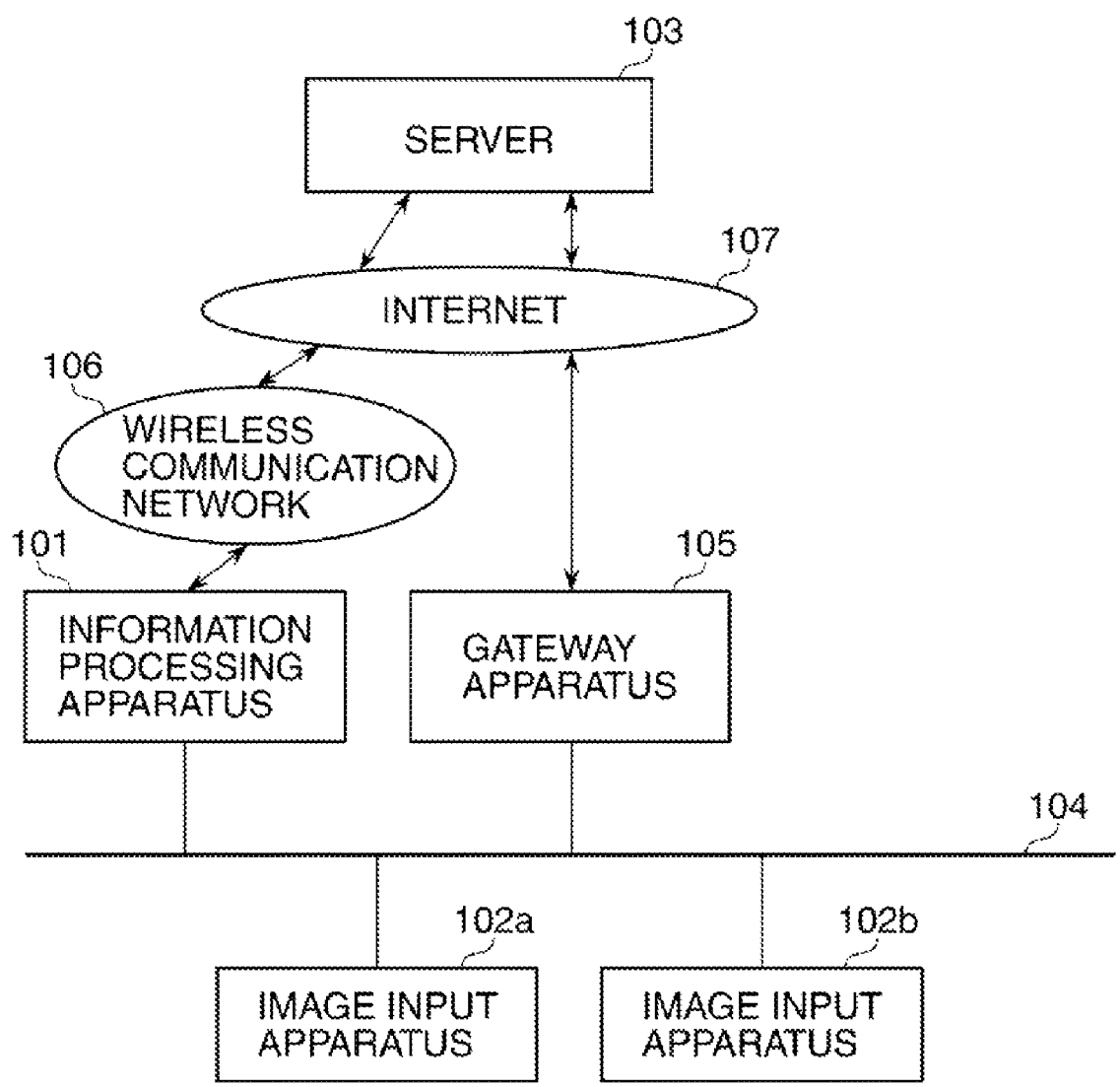
FIG. 1 is a block diagram schematically showing an entire configuration of an image input system according to an embodiment of the present invention.

FIG. 1 is a block diagram schematically showing an entire configuration of an image input system according to an embodiment of the present invention. The image input system is provided with an information processing apparatus 101 that is used by a user, two image input apparatuses 102*a* and 102*b* that transmit image information (image data) generated by performing a scan process to the exterior, and a server 103 that receives the image information by communicating with the information processing apparatus 101.

It should be noted that the system is provided with the only one information processing apparatus 101 in this embodiment in order to facilitate understanding the present invention. However, the system may be provided with more information processing apparatuses. In addition to the image input apparatuses 102*a* and 102*b*, the system may be provided with other image input apparatuses.

The information processing apparatus 101 and the image input apparatuses 102*a* and 102*b* are connected via a local network 104 that is configured by the Ethernet (registered trademark). The information processing apparatus 101 and the server 103 are connected via a wireless communication network 106 like a portable communication network for data communication and the Internet 107. The information processing apparatus 101 and the server 103 are connected with a gateway apparatus 105 located on the local network 104 via the Internet 107 to which the gateway apparatus 105 is connected.

Figure 2:
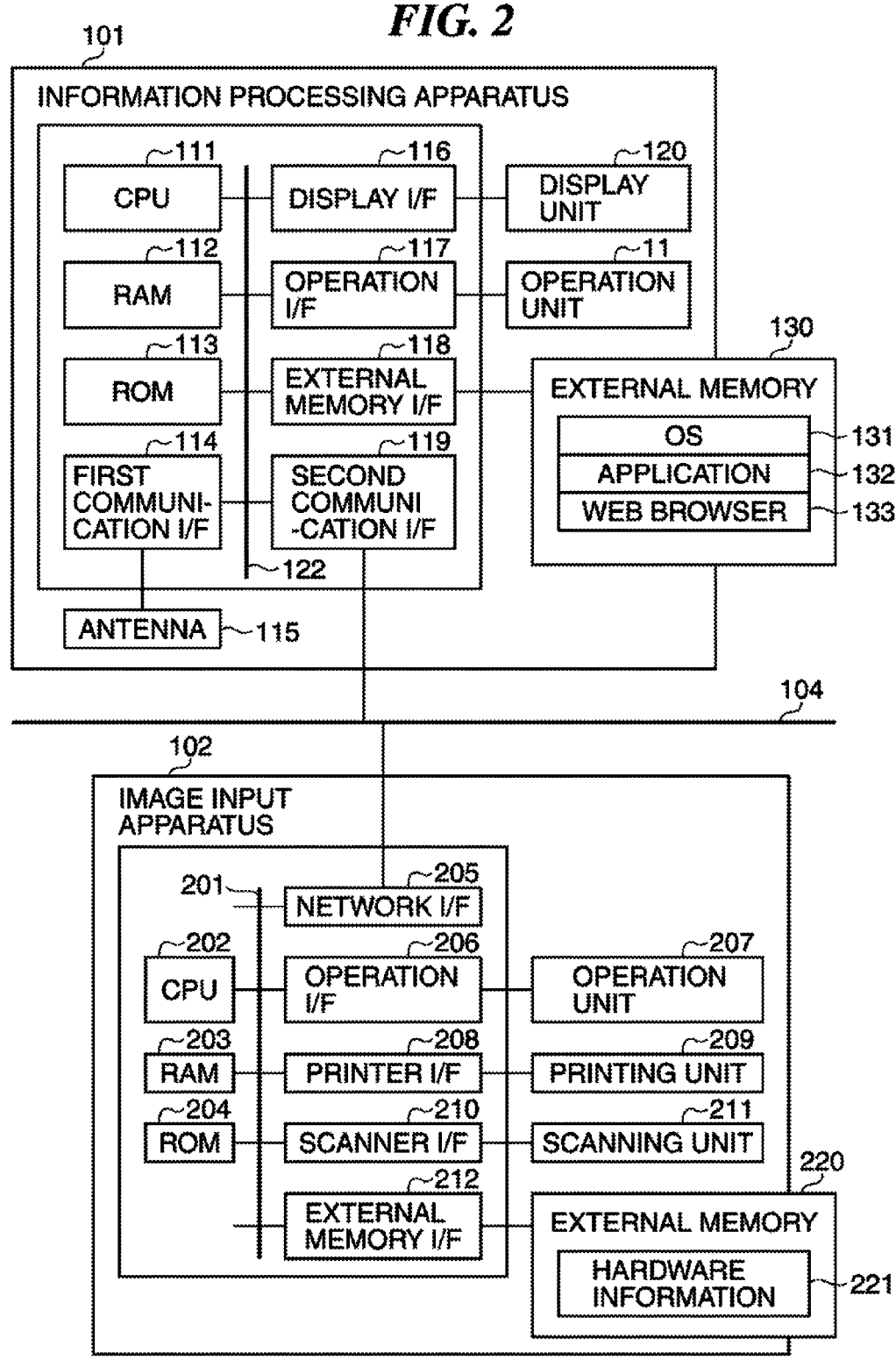
FIG. 2 is a block diagram schematically showing configurations of an information processing apparatus and an image input apparatus with which the image input system shown in FIG. 1 is provided.

FIG. 2 is a block diagram schematically showing configurations of the image forming apparatus 101 and image input apparatus 102*a*. It should be noted that the system configuration of the image input apparatus 102*b* is the same as that of the image input apparatus 102*a*, and hereafter, each of them is described as "the image input apparatus 102" when the image input apparatus 102*a* and the image input apparatus 102*b* are not distinguished.

In the information processing apparatus 101, the CPU 111 totally controls devices connected to a system bus 122 by developing a program stored in a ROM 113 to a work area of a RAM 112 and executing it. In addition to the program, the ROM 113 stores data required for various kinds of controls etc. The RAM 112 functions as a main memory, and functions as the work area for the CPU 111.

An operation I/F 117 controls the inputs from the operation unit 121, pointing devices (a touch panel etc. (not shown)). A display I/F 116 controls indications of various pieces of information to a display unit 120. It should be noted that the display unit 120 is provided with a touch-panel function, and functions also as an operation unit 121. The external memory 130 comprises a flash memory or a solid state disk (SSD), for example, and an external memory I/F 118 controls an access to the external memory 130.

The external memory 130 stores an operating system program (an OS) 131, various kinds of applications 132, and a web browser 133, and functions as a storage medium for the various data used by the information processing apparatus 101. It should be noted that the ROM 113 and the RAM 112 may have a function of the external memory 130.

Script files running on the web browser 133 are not saved in the external memory 130 in the information processing apparatus 101 that a user uses newly in an initial state. In this embodiment, when the script file that configures scanning system environment is not saved in the information processing apparatus 101, the web browser 133, which is executed on the OS 131 of the information processing apparatus 101, is started by a remote operation from the server 103. The script executive operation on the web browser 133 will be described later in detail with reference to FIG. 5A and FIG. 5B.

A first communication I/F 114 is a control unit for communicating using the wireless communication network 106, and forms network connection with a base transceiver station through an antenna 115. A second communication I/F 119 is a control unit for a wireless network (Wi-Fi etc.) or a preference network, and enables connection with the local network 104 through a Wi-Fi antenna or a network terminal (not shown).

In the image input apparatus 102, a CPU 202 controls the whole operations of the image input apparatus 102. A RAM 203 functions as a main memory of the CPU 202, a work area, etc., and is used as an inputting information development area, a scan environment data storage area, etc. The RAM 203 is provided with a NVRAM (Non-volatile RAM) area, and can extend memory space using an option RAM connected to an add-on port (not shown).

A ROM 204 stores various fonts, a control program executed by the CPU 202, and various kinds of data. A network I/F 205 is connected with the local network 104 and enables transmission and reception of data with the information processing apparatuses 101. A printer I/F 208 controls communications with a printing unit 209 that is a printer engine. A scanner I/F 210 controls communications with a scanning unit 211 that is a scanner engine.

An external memory 220 comprises a flash memory or a solid state disk (an SSD), for example, and the external memory I/F 212 controls an access to the external memory 220. In this embodiment, the external memory 220 is able to store hardware information 221. The hardware information 221 includes, for example, the name of the image input apparatus 102, input ability information like resolutions and sheet sizes supported, and transmission capacity information (for example, SMB or WebDAV) to an external apparatus like the server 103. It should be noted that the ROM 204 stores the information used by the information processing apparatus 101, when the external memory 220 is not connected to the image input apparatus 102.

An operation unit 207 that sets up the scan process of the image input apparatus 102 is provided with an operation panel that accepts operations by a user. Switches for operations, LED indicators, etc. are arranged on the operation panel. It should be noted that NVRAM (not shown) may be provided in order to store the scan setting information from the operation panel. An operation I/F 206 controls communications with the operation unit 207.

The CPU 202 acquires image information from the scanning unit 211 via the scanner I/F 210 based on the control program etc. stored in the ROM 204. The CPU 202 is able to communicate with the information processing apparatus 101 via the network I/F 205, transmits the image information to the information processing apparatus 101, and notifies the information processing apparatus 101 of the information inside the image input apparatus 102. In this embodiment, the network I/F 205 mounts the corresponding web service protocol.

FIG. 3 is a block diagram schematically showing a configuration of the server 103. In the server 103, a CPU 301 totally controls devices connected to a system bus 300 by developing a program stored in a ROM 303 to a work area of a RAM 302 and executing it. In addition to the program, the ROM 303 stores data required for various controls. The RAM 302 functions as a main memory, and functions as the work area for the CPU 301.

A keyboard controller I/F 305 controls inputs from a keyboard 309 and a pointing device (not shown) like a mouse. A display I/F 304 controls indications of various pieces of information to a display unit 308. An external memory 320 comprises a hard disk (an HD) or a solid state disk (an SSD), for example, and an external memory I/F 306 controls an access to the external memory 320.

The external memory 320 stores an operating system program (an OS) 321, a web service library 322, and various scan processing related programs 323. The external memory 320 functions as a computer-readable/recordable storage medium that stores user files and edit files (not shown), etc.

The scan processing related programs 323 includes a search program 324, a search script 325, an image input control program 326, a scan job generating program 327, a scan script 328, and an image receiving program 329. The functions of these programs will be described later with reference to FIG. 4A, FIG. 4B, etc.

A network I/F 307 is connected to the information processing apparatus 101 via the Internet 107 and the wireless communication network 106 (FIG. 1). Accordingly, the server 103 can indirectly communicate with the image input apparatuses 102 via the information processing apparatus 101 and the local network 104. It should be noted that the network I/F 307 can communicate with the image input apparatuses 102 via the Internet 107, the gateway unit 105, and the local network 104.

Figure 4B:
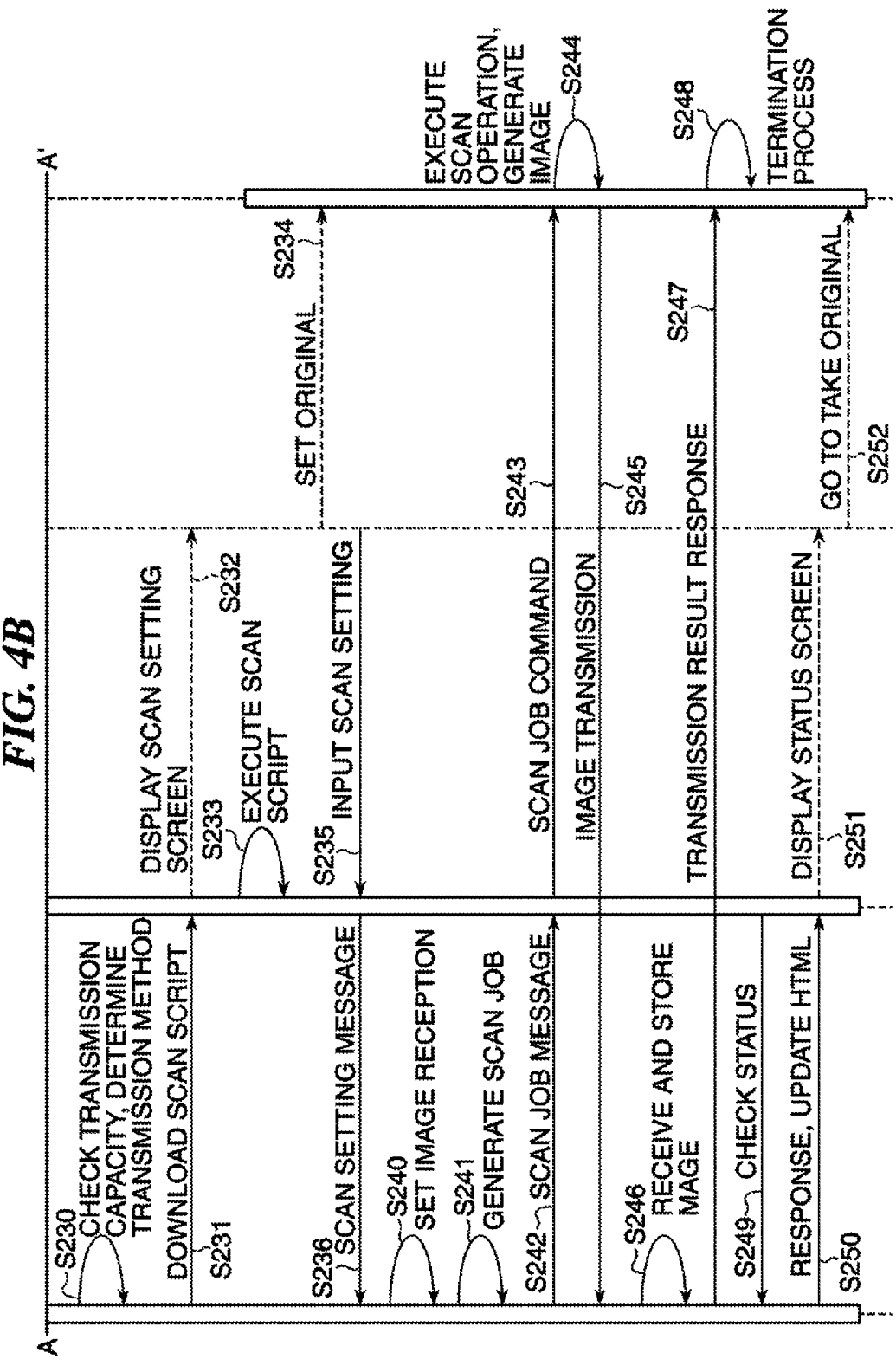

FIG. 4A and FIG. 4B are sequential charts of the scan process in the image input system in FIG. 1, and shows a series of scan processes executed by the respective apparatuses that constitute the image input system. It is assumed that an environment that enables the web browser 133 of the information processing apparatus 101 to access the image input apparatus 102 via the local network 104 is already prepared.

Figure 8:
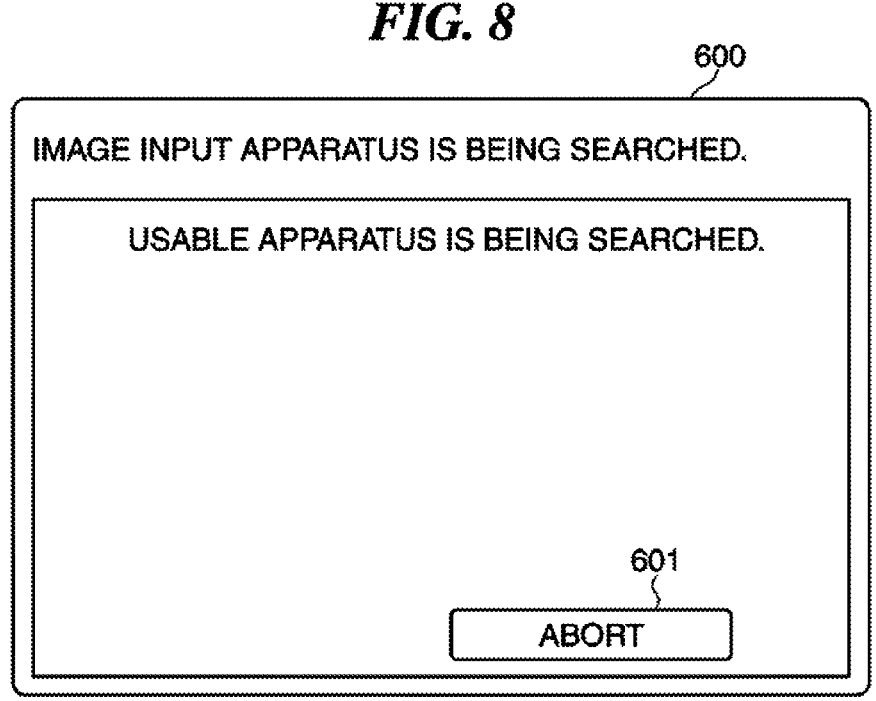
FIG. 8 shows an example of a screen (a user interface) used for displaying that a usable image input apparatus is being searched that is displayed on a display unit of the information processing apparatus.

First, a user operates the operation unit 121 of the information processing apparatus 101, and starts the web browser 133 (step S200). In order to start and use the image input service of the server 103, the web browser 133 accesses URL of the server 103 (step S201), and logs in to an image input service URL. When it succeeded in login, the search script 325 for searching for an image input apparatus is downloaded from the server 103 to the web browser 133 of the information processing apparatus 101 (step S202). The downloaded search script 325 is executed on the web browser 133, and simultaneously, as shown in FIG. 8, a screen (a user interface) including the message of "SEARCHING AVAILABLE APPARATUS." is displayed on the display unit 120 (steps S203 and S204). It should be noted that details of FIG. 8 will be described later.

When the search script 325 is executed in the step S204, the information processing apparatus 101 transmits a search request to the server 103 (step S205). It should be noted that the information processing apparatus 101 transmits an update message for an HTML file to the server 103 periodically, and the server 103 transmits the updated HTML file to the information processing apparatus 101, while the search script 325 is executed. These processes are not illustrated. Accordingly the HTML file is updated on the web browser 133, and the user can know change of the state of the server 103 based on displayed contents.

When receiving the search request, the server 103 generates a search protocol (step S206), and transmits a search message to the information processing apparatus 101 by the search program 324 (step S207). The search script 325 currently executed by the information processing apparatus 101 transmits the received search message to the image input apparatus by broadcasting while using a transfer method (an IP header conversion process of a network packet, etc.) for the local network 104 (step S208). Since the search protocol of broadcasting is transmitted to all the image input apparatuses on the local network 104 in the step S208, the image input apparatuses 102a and 102b serve as transmission targets in this embodiment. An example of the conversion process for packet data executed by the search script 325 will be described later with reference to FIG. 13.

The image input apparatus 102 is started by receiving the search protocol of the broadcasting (step S209). The image input apparatus 102 determines whether the apparatus itself corresponds to the search protocol. Then, the apparatus 102 transmits a response that shows the determination result to the information processing apparatus 101 of the broadcast transmission source (step S210). It should be noted that all the image input apparatuses on the local network 104 return the responses in the step S210. The following description assumes that both of the image input apparatuses 102a and 102b returned responses that show they correspond to the search protocol.

In the step S210, the information processing apparatus 101 acquires the hardware information 221 about the image input apparatus 102 from the image input apparatus 102 found by the broadcast transmission. The method of the broadcast transmission in the search process for an image input apparatus is not limited in particular. The broadcast transmission includes a multicast transmission etc. that are used by an SSDP (Simple Service Discovery Protocol) or a WSD (Web Services On Devices), for example.

When receiving the response from the image input apparatus 102, the search script 325 that is operating on the web browser 133 in the information processing apparatus 101 converts the response into a response message, and transmits it to the server 103 one by one (step S211). An example of the process for converting a response to a response message by the search script 325 will be described later with reference to FIG. 13.

Figure 9:
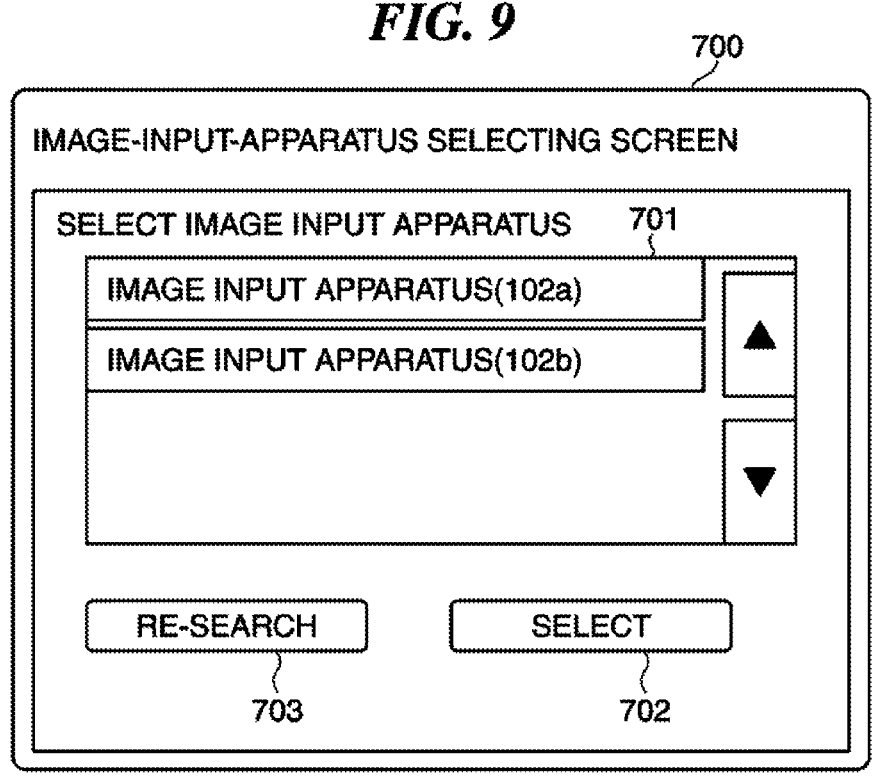
FIG. 9 shows an example of a list screen (a user interface) used for selecting an image input apparatus that is displayed on the display unit of the information processing apparatus.

After the step S211, the server 103 analyzes the response message received from the information processing apparatus 101 by means of the image input control program 326, and generates an image-input-apparatus list based on the search result of an image input apparatus (step S220). The generated image-input-apparatus list is converted into an HTML file by the image input control program 326, is updated, and is transmitted to the information processing apparatus 101 (step S221). Accordingly, in the information processing apparatus 101, an image-input-apparatus list screen of the as shown in FIG. 9 is displayed on the display unit 120 by the web browser 133 (step S222). It should be noted that details of FIG. 9 will be described later.

When a user selects the image input apparatus used from among the image input apparatuses shown in the list screen (step S223), the web browser 133 transmits the selected result as a selected result message to the server 103 (step S224). The server 103 determines the transmission method (transmission route) of the image information by the image input control program 326 based on the transmission capacity information about the image input apparatus that has been acquired in the step S211 (step S230). The transmission routes include a route (referred to as a "route A") through which the selected image input apparatus directly transmits the image information to the server 103 and a route (referred to as a "route B") through which the image input apparatus transmits the image information to the server 103 via the information processing apparatus 101. It should be noted that the route A is used only when the transmission capacity information included in the hardware information 221 of the selected image input apparatus shows that the direct submission of the image information from the selected image input apparatus to the server 103 is possible.

It should be noted that the transmission route may be determined based on the following check method in the step S230. That is, the web browser 133 of the information processing apparatus 101 downloads a connection check script from the server 103. When this connection check script is executed, the web browser 133 transmits a connection check protocol to the image input apparatus. The image input apparatus tries to connect to a designated URL by a designated transmission protocol according to the received connection check protocol. The image input apparatus returns the connection result as a response to the web browser 133 of the information processing apparatus 101. A response message is transmitted to the server 103 by the connection check script that is operating on the web browser 133 of the information processing apparatus 101 that received the response. The server 103 determines a transmission route based on the result of this response in the step S230.

Alternatively, the transmission route may be determined based on a result of the following check method in the step S230. That is, the servers 103 checks whether the communication line that connects the server 103 and the information processing apparatus 101 is a mobile phone line network (the 3G, etc.) or a wireless LAN (the Wi-Fi etc.). When the communication line is the mobile phone line network, the connection check script mentioned above checks whether the image input apparatus is connectable to the server 103. If connectable, it is determined that the route A is used. If not connectable, it is determined that the route B is used. When the communication line is the wireless LAN, it is determined that the route B is used. These processes aim to avoid increasing communication packet charge paid by a user when using the mobile phone line network that takes long communication time due to small line capacity.

After the step S230, the server 103 selects the scan script 328 suitable for the image input apparatus selected in the step S223. The scan script 328 selected as such is downloaded to the web browser 133 of the information processing apparatus 101 (step S231). In the step S231, when the route A is selected in the step S230, a script for an image input apparatus to transmit the image information to the server 103 directly without passing through the information processing apparatus 101 is downloaded. On the other hand, when the route B is selected in the step S230, a script for an image input apparatus to transmit the image information to the server 103 via the information processing apparatus 101 is downloaded. Hereafter, FIG. 4B describes the case where the route A is selected.

Figure 10:
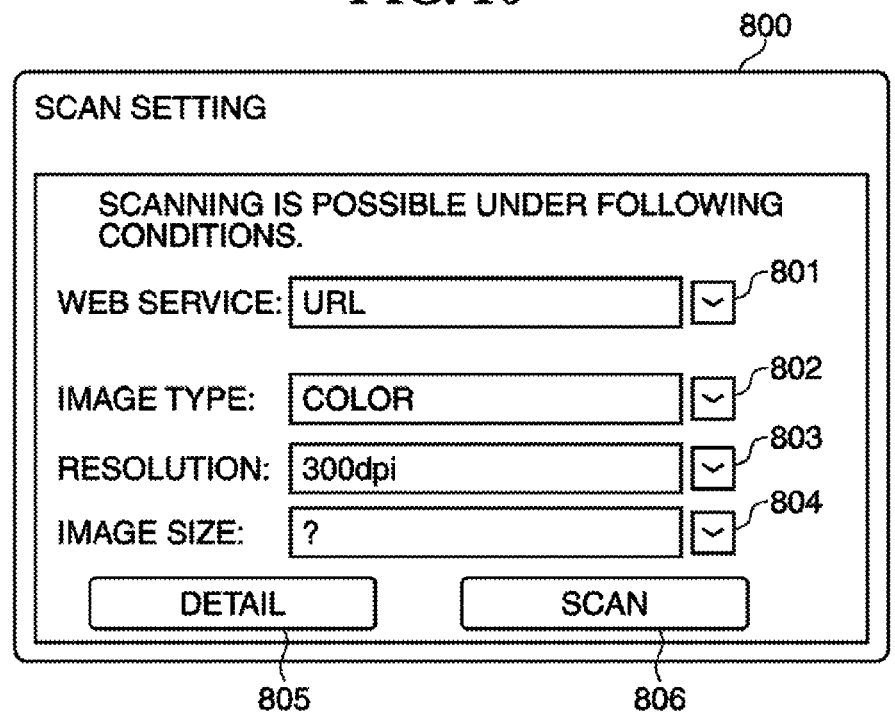
FIG. 10 shows an example of a scan setting screen (a user interface) that is displayed on the display unit of the information processing apparatus.

In the information processing apparatus 101, the scan script 328 is executed and a scan setting screen as shown in FIG. 10 is displayed on the display unit 120 (steps S232 and S233). It should be noted that the scan setting screen in FIG. 10 will be described later in detail.

The user sets an original to the selected image input apparatus (step S234), and inputs a scan setting through the information processing apparatus 101 (step S235). It should be noted that the information processing apparatus 101 transmits an update message for an HTML file to the server 103 periodically, and the server 103 transmits the updated HTML file to the information processing apparatus 101, while the scan script 328 is executed. These processes are not illustrated. Accordingly, the HTML file is updated on the web browser 133, user and the user can know change of the state of the server 103 based on the displayed contents.

The contents set up in the step S235 are transmitted to the server 103 by the scan script 328 as a scan setting message (step S236). The scan job generating program 327 of the server 103 performs an image reception setting (step S240). Specifically, the scan job generating program 327 specifies a URL of the server 103 used as a preservation destination based on the setting message in the step S236, and permits the image input apparatus to transmit the image information to the URL. At this time, the server 103 holds a unique authentication ID for authenticating the transmitting source of an image.

Subsequently, the server 103 generates a scan job based on the setting message of the step S236 (step S241). Then, the server 103 performs a job-message transmission that transmits the generated scan job to the information processing apparatus 101 as a scan job message (step S242). The information processing apparatus 101 transmits the received scan job message to the image input apparatus selected as a scan job command by the scan script 328 (a job transmission, step S243). The image input apparatus that received this scan job command executes a scan operation, and generates an image (step S244).

The process after the step S244 varies with the decision result in the step S230. When the route A is selected, as shown in FIG. 4B, the image input apparatus directly transmits the generated image information by the designated transmitting protocol (for example, WebDAV etc.) to the destination URL of the server 103 (step S245). Since the image input apparatus needs to be authenticated by the server 103 at this time, the transmission data includes the information required for authentication, such as the authentication ID.

On the other hand, when the route B is used, the scan script 328 currently executed by the information processing apparatus 101 once receives the image information from the image input apparatus. This process is not illustrated. Then, the scan script 328 transmits the image information to the server 103 while keeping the data contents using the transfer method (an IP header conversion process of a network packet, etc.).

In the server 103, the image receiving program 329 authenticates the image input apparatus of the image transmitting source using the information for authentication, such as the authentication ID, which has been held in the step S240, and receives the image information when the authentication is succeeded. Then, a suitable image conversion process is applied to the received image information, and the final image information is stored (step S246). In this way, when the image information is saved, the server 103 replies a transmitting result as a response to the image input apparatus of the transmitting source (step S247), and the image input apparatus performs a termination process when receiving the response (step S248).

Figure 11:
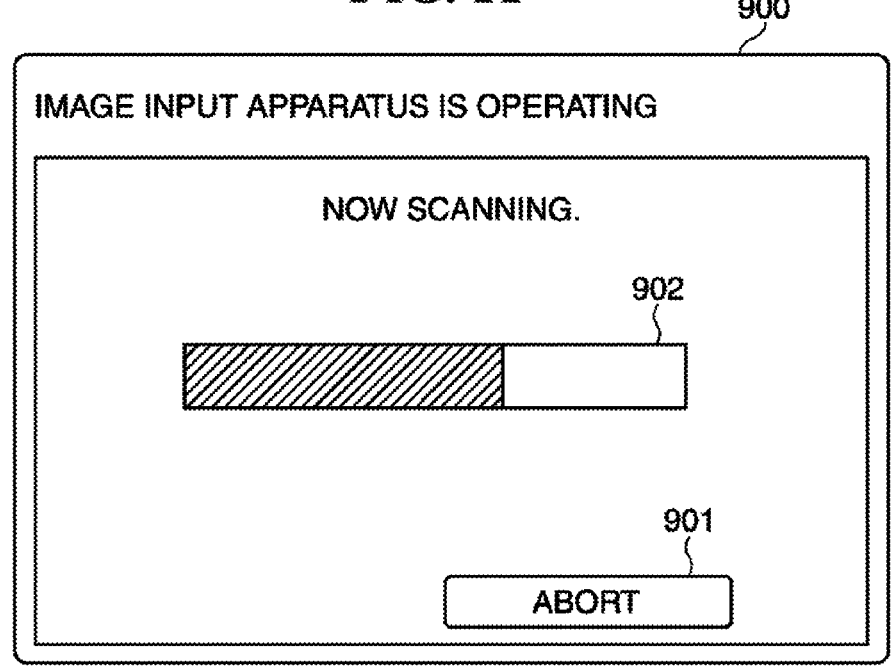
FIG. 11 shows an example of a screen (a user interface) used for notifying a proceeding state of the scan process that is displayed on the display unit of the information processing apparatus.

After the step S242 in which the scan job is executed, the web browser 133 of the information processing apparatus 101 periodically transmits the update message for an HTML file to the server 103 in order to check the status of the server 103. Since the change of the state of the server 103 updates the HTML file, a screen showing the progress state of the scan process as shown in FIG. 11 is displayed on the operation unit 121 of the information processing apparatus 101. It should be noted that the screen in FIG. 11 will be described later in detail.

Figure 12:
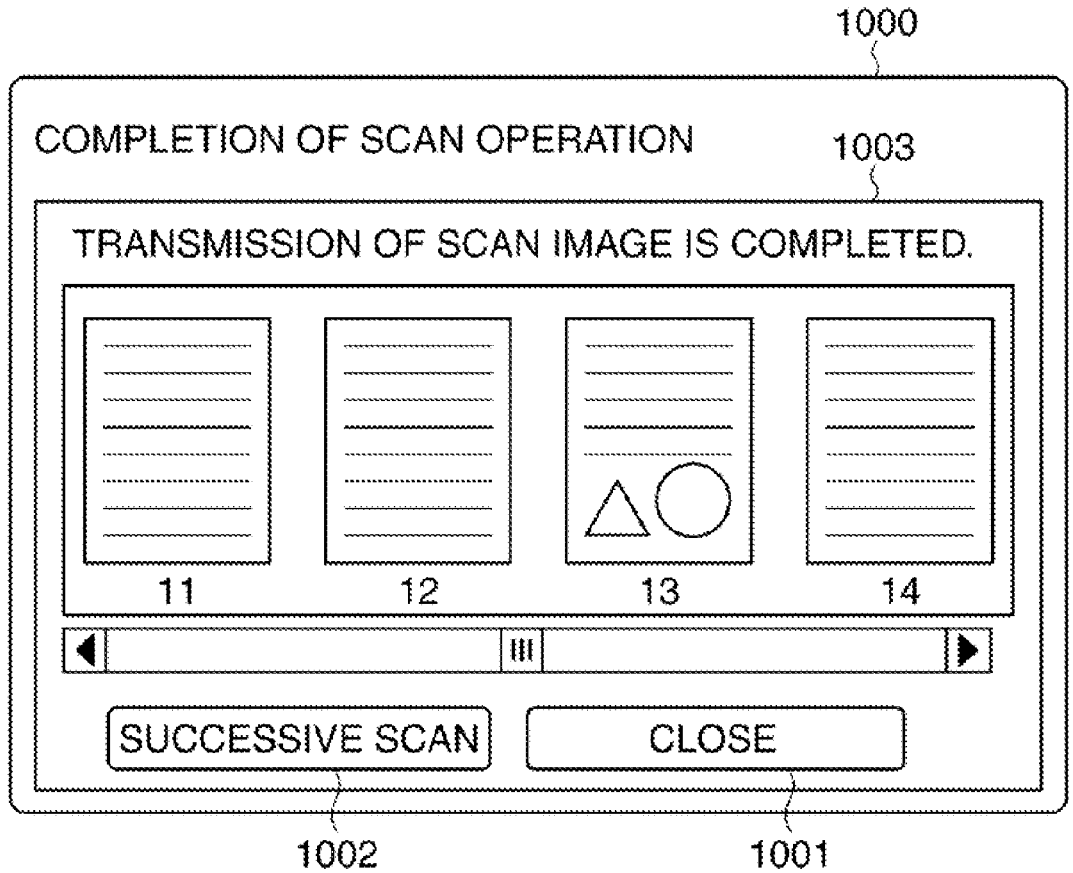
FIG. 12 shows an example of a scan process termination notice screen (a user interface) that is displayed on the display unit of the information processing apparatus.

When the image storage process in the step S246 is completed, the server 103 updates the HTML file according to the update message (the step S249) for the HTML file for the status check by the information processing apparatus 101 (step S250). Accordingly, the web browser 133 of the information processing apparatus 101 displays a scan termination notice screen as shown in FIG. 12 on the display unit 120 (step S251). It should be noted that the screen in FIG. 12 will be described later in detail.

When the scan termination notice screen is displayed on the operation unit 121, the user goes to take the original that has been scanned to the image input apparatus (step S252), and accordingly the scan processing sequence is finished. The image information produced by scanning the original by the above scan processing sequence is stored into the server 103.

Figure 5A:
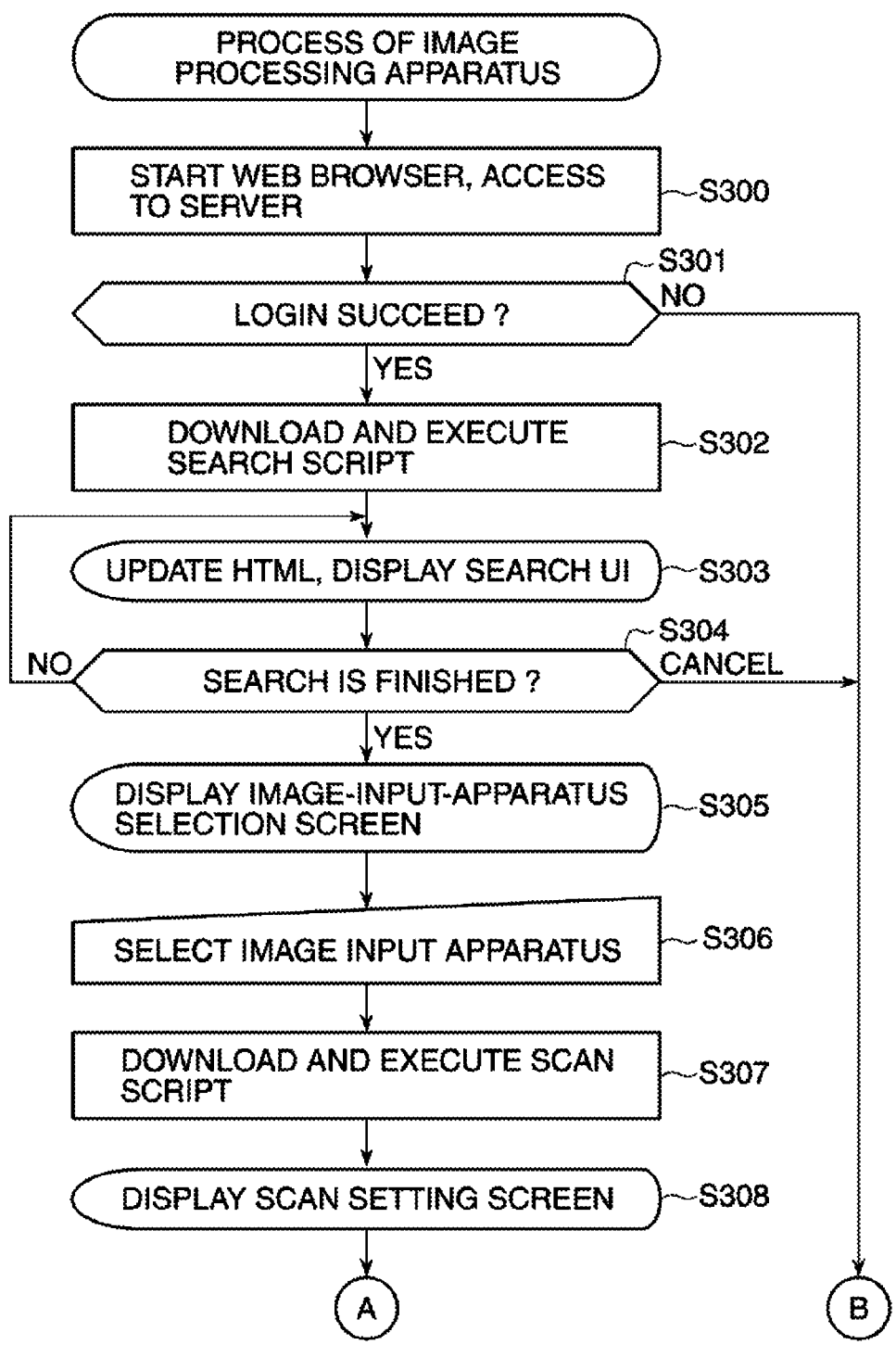
FIG. 5A and FIG. 5B are flowcharts showing a process of the information processing apparatus in the scan process executed by the image input system in FIG. 1.
Figure 5B:
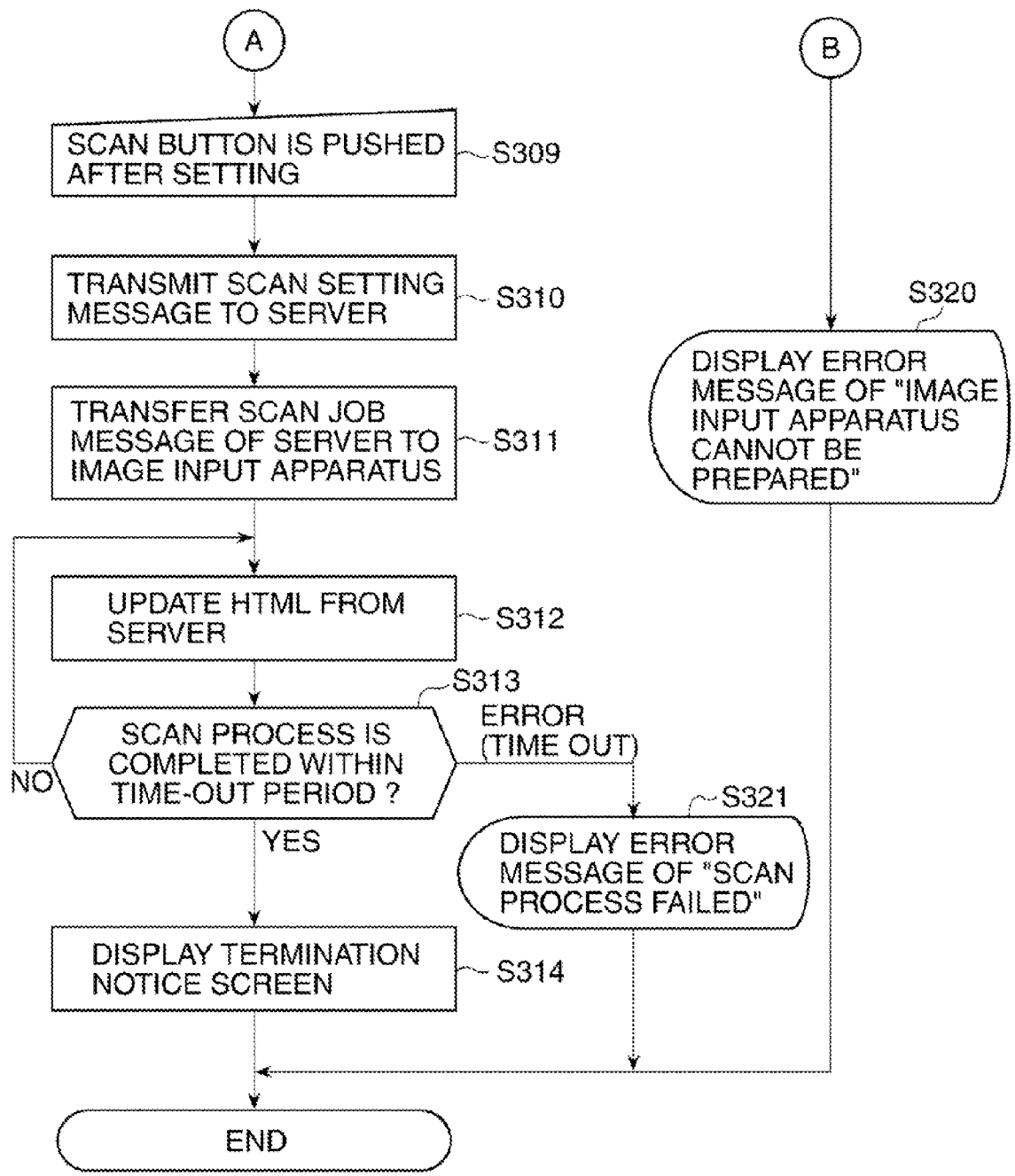

FIG. 5A and FIG. 5B are flowcharts showing an example of a process of the information processing apparatus 101 in the scan process of the image input system. Specifically, FIG. 5A and FIG. 5B show an example of a process by the OS 131 and the web browser 133 of the information processing apparatus 101. The processes shown in FIG. 5A and FIG. 5B are achieved by controlling the functions of the respective units that constitute the information processing apparatus 101, when the CPU 111 develops and executes the program stored in the ROM 113 to the work area of the RAM 112.

First, the CPU 111 starts the web browser 133, and accesses to the URL of the server 103 by the web browser 133 (step S300). Then, the CPU 111 transmits a login request (message) to the web page that is hosted by the web service library 322 of the server 103 to try to log in, and determines whether login succeeded (step S301).

When the login failed (NO in the step S301), the CPU 111 displays an error message of "IMAGE INPUT APPARATUS IS NOT READY" on the web browser 133 (step S320), and then, finishes the process. When the login succeeded (YES in the step S301), the CPU 111 downloads the search script 325 for searching for an image input apparatus from the server 103 via the Internet 107, and executes it on the web browser 133 (step S302).

When the search script 325 is executed, the information processing apparatus 101 transmits a message of search request to the server 103, and the information processing apparatus 101 receives the search message as a response thereof. This process is not illustrated in FIG. 5A and FIG. 5B. The CPU 111 converts the IP header of the network packet concerning the search message by the search script 325, and performs broadcast transmission to the image input apparatuses connected to the local network 104. The broadcast transmission in this search process may be performed by a multicast transmission that is used in SSDP or WSD. The CPU 111 converts the IP header of the network packet with respect to the response that an image input apparatus returns by broadcast transmission by the search script 325, and transmits it to the server 103 as a response message. In addition, the CPU 111 acquires the hardware information 221 about the image input apparatus found by the broadcast transmission by the search script 325.

While executing the process by the search script 325, the CPU 111 transmits the update message for the HTML file to the server 103 periodically, and receives the updated HTML file. Therefore, the CPU 111 displays a screen (a user interface; UI) showing that image input apparatuses are being searched on the display unit 120 by the web browser 133 (step S303). FIG. 8 shows an example of a screen (a search UI) used for displaying that a usable image input apparatus is being searched that is displayed on the display unit 120 in the step S303.

The screen 600 is achieved when the CPU 111 displays the HTML file that is updated by the server 103 under a condition where the search script 325 is executed on the web browser 133 executed on the RAM 112. When the user pushes an abort button 601 displayed in the screen 600, the CPU 111 transmits an abort message to the server 103 by the search script 325. Accordingly, the search process is aborted.

The CPU 111 determines whether the search process for an image input apparatus by the server 103 has finished by the search script 325 based on the update of the HTML file from the server 103 (step S304). Here, when the process is canceled by pushing the abort button 601 ("CANCEL" in the step S304), the CPU 111 proceeds a process to step S320. Since the process in the step S320 has been already described, a description here is omitted.

When the search process for an image input apparatus is not finished (NO in the step S304), the CPU 111 returns the process to the step S303. When the search process for an image input apparatus is finished, the image input control program 326 of the server 103 generates the HTML file for selecting an image input apparatus. When the search process for an image input apparatus is finished (YES in the step S304), the CPU 111 receive the HTML file for selecting an image input apparatus from the server 103. Then, the CPU 111 displays a screen for selecting an image input apparatus to be used by the web browser 133 on the display unit 120 (step S305). FIG. 9 shows an example of a list screen used for selecting an image input apparatus that is displayed on the display unit 120 in the step S305.

In the list screen 700, list buttons 701 that show image input apparatuses found by the search process for an image input apparatus are displayed. In this embodiment, the list buttons 701 respectively corresponding to the image input apparatuses 102*a* and 102*b* are displayed. When the user pushes a select button 702 after selecting the image input apparatus used among from the list buttons 701, the CPU 111 transmits a selected result message to the server 103 by the search script 325 (step S306). The server 103 that received this selected result message prepares the scan script 328 corresponding to the selected image input apparatus.

It should be noted that the CPU 111 executes the search script 325 again when the user pushes a re-search button 703 displayed on the list screen 700, Accordingly, the search script 325 transmits the search request for an image input apparatus as a message again to the server 103. In this way, the steps S303 through S305 (the steps S206 through S222 in FIG. 4A) are executed again, and the indication of the list buttons 701 in the list screen 700 are updated.

When the image input apparatus used is selected in the step S306, the CPU 111 downloads the corresponding scan script 328 from the server 103, and executes it by the web browser 133 (step S307). It should be noted that the downloaded scan script 328 is decided based on the hardware information 221 about the image input apparatuses acquired in the steps S302 through S304. For example, when the selected image input apparatus has the transmission capacity to the server 103, the scan script 328 that directs the direct transmission of the scanned image information to the server 103 without passing through the information processing apparatus 101 is downloaded.

When the CPU 111 executes the scan script 328 in the step S307, the scan setting screen for registering a scan setting as shown in FIG. 10 is displayed on the display unit 120 (step S308). FIG. 10 shows an example of the scan setting screen displayed on the display unit 120 in the step S308.

The scan setting screen 800 has a web service selection drop down combo box 801 for designating a preservation destination of the scanned image information. The preservation destination is designated by a method of directly inputting a URL that can identify the preservation destination, a method of searching for a service having an image-information preservation function from Web, a method of selecting a desired preservation destination from a history, or the like.

An image type drop down combo box 802 displayed on the scan setting screen 800 is used when designating a color mode of the scanning, and the user can designate monochrome, color, gray scale, etc. A resolution drop down combo box 803 is used when designating resolution of the scanning. The resolution is designated by selecting a value from a displayed list, or by designating a value that the user directly inputs. An image size drop down combo box 804 is used when designating an image size of the scanning. The image size is set by designating a regular size (A4, Legal, etc.), or is automatically set by detecting a size by a detection sensor, for example.

The scan process according to the scan setting in the various combo boxes is started when a scan button 806 is pushed. Namely, when the scan button 806 is pushed, the CPU 111 transmits the setting contents in the various combo boxes at the time of the depression of the scan button 806 as a scan setting message to the server 103 according to the scan script 328.

When a detail button 805 displayed on the scan setting screen 800 is pushed, an option screen (not shown) for setting details of the scan is displayed. This option screen is displayed on the display unit 120 because the CPU 111 updates the HTML file for the scan setting screens by the scan script 328, for example. When the user updates the setting contents in the option screen and pushes a button to save the updated setting, the display returns to the scan setting screen 800. Thus, the CPU 111 controls the display on the web browser 133 by the scan script 328.

The scan setting screen 800 urges the user to start the scan setting and the scan process. When the user finishes the scan setting and pushes the scan button 806 (step S309), the CPU 111 transmits the generated scan setting message to the server 103 by the scan script 328 (step S310). Next, the CPU 111 transfers the scan job message that is transmitted from the server 103 to the image input apparatus selected in the step S306 via the local network 104 (step S311). This scan job message designates the image input apparatus to execute the scan process and the transmitting process of the image information.

When the image information is transmitted through the above-mentioned route A, the transmitting process is instructed so that the image input apparatus directly exchanges with the server 103 without passing through the information processing apparatus 101. The information included in the scan job message at this time is the input information (resolution, a sheet size, etc.) required for the scan process, the destination URL of the image information, the transmitting protocol (WebDAV etc.), the authentication ID used by the authentication at the time of transmission, etc. The image input apparatus transmits the image information to the server through a direct connection using these pieces of information.

On the other hand, when the image information is transmitted through the above-mentioned route B, the transmitting process is instructed so that the image information is transferred to the server 103 via the information processing apparatus 101. In this case, the image information included in the response is transferred to the server 103 as a result by repeating the transmission of the response replied from the image input apparatus to the server 103 by the CPU 111. Hereafter, the process using the route A is described after the step S312 in the flowchart in FIG. 5B.

The CPU 111 transmits the update message for the HTML file to the server 103 periodically (step S312) during the scan process or the transmission of the image information. Since the change of the state of the server 103 updates the HTML file, the CPU 111 displays a progress state of the process on the display unit 120 by the web browser 133 based on the updated HTML file in the step S312. FIG. 11 shows an example of the screen for notifying the progress state of the scan process on the display unit 120 in the step S312.

The screen 900 for notifying the progress state is displayed on the display unit 120 when the scan button 806 is pushed in the scan setting screen in FIG. 10. The notice screen 900 is displayed by the scan script 328 that the CPU 111 is executing on the web browser 133 until the image information scanned is stored into the server 103 from the start of the scan operation (step S244) in the image input apparatus.

An abort button 901 in the notice screen 900 is used for aborting the scan process currently executed. When the abort button 901 is pushed, the CPU 111 transmits a scanning abort message to the server 103 by the scan script 328. Accordingly, the scan job message with the abort information is transmitted from the server 103 to the information processing apparatus 101 (similar to the step S242), and also a series of job abort commands are transmitted to the image input apparatus in the same manner as the step S243.

A scan process progress indicator 902 in the notice screen 900 serially shows the progress state in the scan process in the step S244 (see FIG. 4B), and is updated when the CPU 111 updates the notice screen 900 by the scan script 328. It should be noted that the progress state in the image-information transmitting process in the step S245 (see FIG. 4B) is also notified to the user through a screen similar to the notice screen in FIG. 11.

After the step S312, the CPU 111 determines whether the image storage process (the step S246 in FIG. 4B) was completed while the image-information reception does not exceed a fixed time-out period (step S313). When the image storage process is not completed and the time-out period is not exceeded (NO in the step S313), the CPU 111 returns the process to the step S312. When the image storage process is not completed and the time-out period was exceeded (an "error" in the S313), the CPU 111 receives an HTML file showing an error from the server 103. Accordingly, the CPU 111 displays a message of "SCAN PROCESS FAILED" on the operation unit 121 by the web browser 133 (step S321), and then, finishes the process. It should be noted that the CPU 111 executes the process similar to this error handling when the abort button 901 in the notice screen 900 is pushed.

When the image storage process was completed normally within the time-out period (YES in the step S313), the CPU 111 display a screen of the terminating notice of a scan process like FIG. 12 on the display unit 120 by the web browser 133 (step S314). FIG. 12 shows an example of the termination notice screen for the scan process displayed on the display unit 120 in the step S314.

The termination notice screen 1000 for the scan process is displayed as follows. That is, when the server 103 finishes receiving the image information, the image receiving program 329 of the server 103 generates an HTML file including a reduction image that the information processing apparatus 101 can display based on the received image information. Then, the server 103 transmits the generated HTML file to the information processing apparatus 101. The CPU 111 displays the termination notice screen 1000 on the operation unit 121 by the web browser 133 based on the received HTML file. Accordingly, the user acknowledges that the scan process was completed normally.

In order to notify the user of the scan image that has been finally stored into the server, the termination notice screen 1000 contains a reduction image display area 1003 in which the reduction image included in the HTML file is displayed. When the user pushes a close button 1001 in the termination notice screen 1000, the CPU 111 terminates the scan script 328 executed on the web browser 133, and thereby closes the termination notice screen 1000. In this way, the series of processes by the information processing apparatus 101 are completed. When the user pushes a successive scan button 1002, the CPU 111 returns the process to displaying the scan setting screen 800 shown in FIG. 9 (the step S231 in FIG. 4B).

Figure 6B:
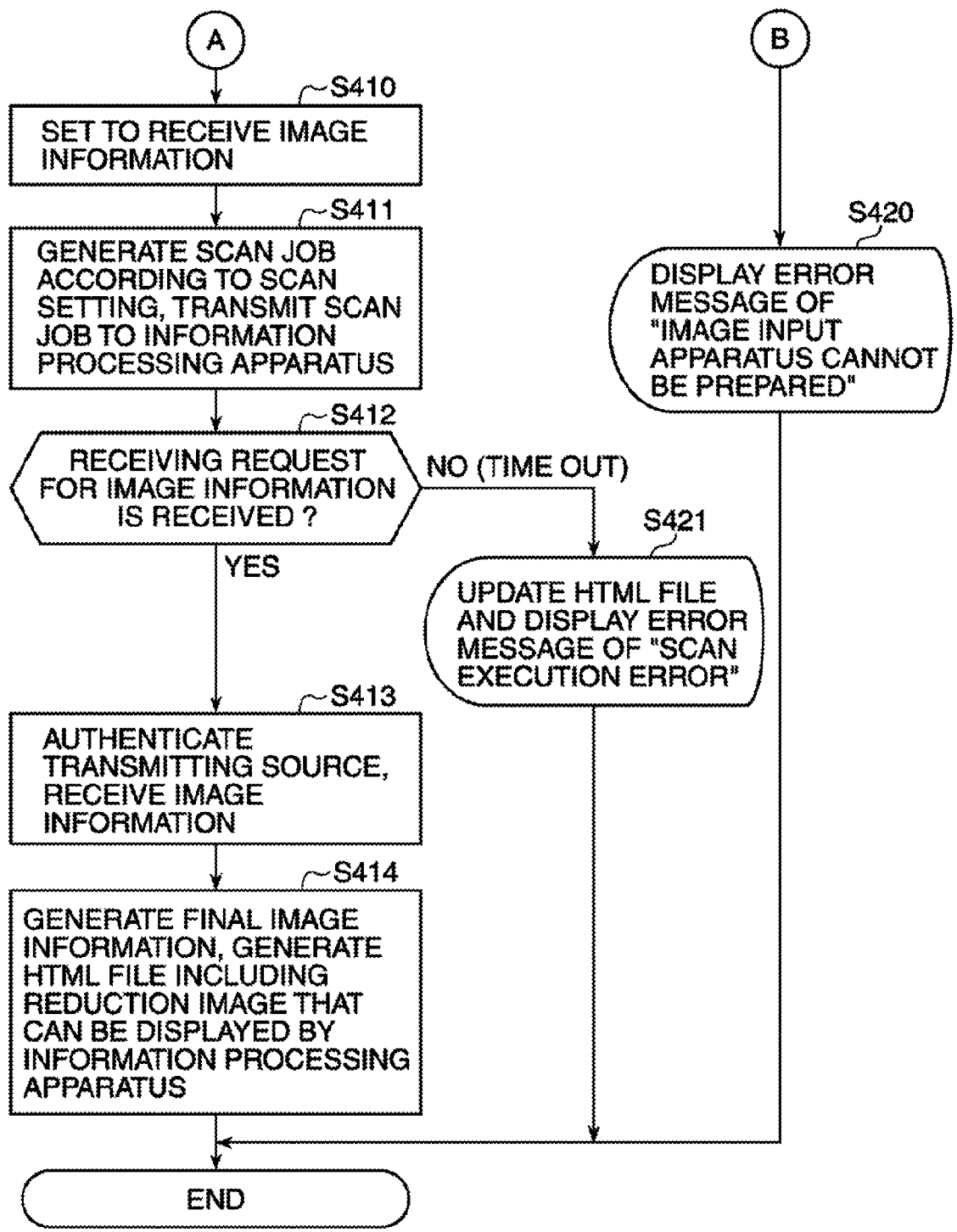

FIG. 6A and FIG. 6B are flowcharts showing an example of a process of the server 103 in the scan process of the image input system. The processes shown in FIG. 6A and FIG. 6B are achieved by controlling the functions of the respective units that constitute the information processing apparatus 103, when the CPU 301 develops and executes the program stored in the ROM 303 to the work area of the RAM 302.

First, the CPU 301 of the server 103 determines whether the login request is received from the information processing apparatus 101 (step S400), and waits until receiving the login request (NO in the step S400). When receiving the login request and permitting login (YES in the step S400), the CPU 301 transmits the search script 325 to the information processing apparatus 101 (step S401).

When the search script 325 is executed on the web browser 133 of the information processing apparatus 101, the information processing apparatus 101 transmits a search request to the server 103. Then, the CPU 301 determines whether the search request has been received from the information processing apparatus 101 (step S402). When the search request has not been received within a fixed time period (NO in the step S402), the CPU 301 proceeds with the process to step S420.

The process in the step S420 uses the fact that the search script 325 currently executed in the information processing apparatus 101 transmits an update message for an HTML file to the server 103 periodically. Specifically, the CPU 301 generates an HTML file including a message of "IMAGE INPUT APPARATUS CANNOT BE PREPARED" showing that the scan process environment cannot be prepared by the search program 324 as a response to the update message of this HTML file. When the generated HTML file is transmitted to the information processing apparatus 101, the message is displayed on the display unit 120 by the web browser 133 of the information processing apparatus 101. The CPU 301 terminates the process after finishing the process in the step S420.

When the search request is received (YES in the step S402), the CPU 301 transmits a search message to the information processing apparatus 101 by the search program 324, and receives and analyzes the response during a fixed time period (step S403). When the response has been received or when the fixed time period elapsed, the CPU 301 determines whether the search program 324 received a search result (step S404).

When a search result has not been received within the fixed time period (NO in the step S404), the CPU 301 proceeds with the process to the step S420. Since the process in the step S420 has been already described, a description here is omitted. When the search result is received within the fixed time period (YES in the step S404), the CPU 301 starts the image input control program 326 (step S405). Specifically, the CPU 301 generates and updates an HTML file for the list screen for selecting an image input apparatus by the image input control program 326, and transmits it to the web browser 133 of the information processing apparatus 101. The CPU 301 receives a response by the user through the list screen of an image input apparatus displayed by the web browser 133 in the information processing apparatus 101 during the fixed time period by a polling operation.

The CPU 301 checks whether the selected result message (see the step S224 in FIG. 4A) of an image input apparatus has been received from the information processing apparatus 101 by the image input control program 326 (step S406). When a selected result message is not received within the fixed time period due to a reason that the user does not select an image input apparatus etc. (NO in the step S406), the CPU 301 proceeds with the process to the step S420. Since the process in the step S420 has been already described, a description here is omitted. When a selected result message is received (YES in the step S406), the CPU 301 determines the transmission method of the image information about the selected image input apparatus based on the transmission capacity information etc. of the image input apparatus acquired in the step S403 (step S407).

The transmission methods are the route A and the route B that are described with reference to FIG. 4B. When the selected image input apparatus has capacity to transmit the image information to the server 103 directly, it is determined to transmit directly according to the transmitting protocol of the transmission capacity, and the route A is selected. On the other hand, when the selected image input apparatus does not have the capability to transmit the image information to the server 103 directly, the route B that transfers the image information to the server 103 via the information processing apparatus 101 is selected.

It should be noted that the determination method in the step S407 is equivalent to the determination method in the step S230 in FIG. 4B. Therefore, the other determination methods that have been already described as the determination methods in the step S230 can be used as the determination method in the step S407. The description about the other determination methods is omitted.

After the step S407, the CPU 301 searches for the scan script 328 suitable for the selected image input apparatus by the image input control program 326 based on the determination result in the step S407. Moreover, the CPU 301 transmits the retrieved scan script 328 to the web browser 133 in the information processing apparatus 101 (step S408).

When it is determined that the route A is used in the step S407, the retrieved scan script 328 becomes a script for transmitting the image information from the selected image input apparatus to the server 103 directly without passing through the information processing apparatus 101. On the other hand, when it is determined that the route B is used in the step S407, the retrieved scan script 328 becomes a script for transferring the image information from the selected image input apparatus to the server 103 via the information processing apparatus 101. It is not shown in FIG. 6A and FIG. 6B.

The image information may be transmitted to the server 103 directly by a transmitting protocol (WebDAV etc.) that the selected image input apparatus can execute. The image information may be transmitted without passing through the information processing apparatus 101 by converting the receiving destination of the image information at the time when the image input apparatus 101 instructs the image input apparatus selected by the web service protocol like the WSD into the preservation destination URL of the server 103.

Hereafter, it should be determined that the route A is used. In this case, the CPU 301 checks whether a scan setting message (see the step S220 in FIG. 4A) has been received by the image input control program 326 (step S409). When a scan setting message has not been received within the fixed time period (NO in the step S409), the CPU 301 proceeds with the process to the step S420. Since the process in the step S420 has been already described, a description here is omitted. When a scan setting message has been received within the fixed time period (YES in the step S409), the CPU 301 proceeds with the process to the step S410.

In the step S410, the CPU 301 acquires a destination URL from the scan setting message, and sets up to permit the acquired destination URL to receive the image information from the image input apparatus (step S410). At this time, the CPU 301 generates a unique authentication ID for authenticating the transmitting source of the image information, and holds it. Subsequently, the CPU 301 starts the scan job generating program 327, generates a scan job according to the scan setting message, and transmits the scan job to the web browser 133 of the information processing apparatus 101 (step S411). The scan job includes procedures of the scan process and the transmitting process, and information required for the respective processes. For example, a scan setting, a destination URL, a transmitting protocol, authentication ID, etc. are included in the scan job.

Next, the CPU 301 starts the image receiving program 329, and checks whether a receiving request for the image information has been received (step S412). When a receiving request for the image information has not been received within the fixed time period (NO (time out) in the step S421), the CPU 301 proceeds with the process to the step S421.

The process in the step S421 uses the fact that the search script 325 currently executed in the information processing apparatus 101 transmits an update message for an HTML file to the server 103 periodically. Namely, the CPU 301 generates an HTML file including a message of "SCAN EXECUTION ERROR" showing that the scan execution environment cannot be prepared by the image receiving program 329 as a response to the update message of this HTML file. When the generated HTML file is transmitted to the information processing apparatus 101, the message is displayed on the display unit 120 by the web browser 133 of the information processing apparatus 101. The CPU 301 terminates the process after finishing the process in the step S421.

When the receiving request for the image information is received (YES in the step S412), the CPU 301 authenticates the transmitting source based on the authentication ID that is generated and held in the step S410 by the image receiving program 329 (step S413). When the authentication succeeded, the CPU 301 receives the image information from the image input apparatus, generates final image information based on the received image information, stores it, and returns the received result as a response to the image input apparatus as the transmitting source. Then, the CPU 301 generates an HTML file including a reduction image that can be displayed by the information processing apparatus 101 (step S414). Then, the scan process and the transmitting process in the server 103 are finished.

It should be noted that the CPU 301 periodically receives the update massage for the HTML file from the web browser of the information processing apparatus 101 while executing the scan process and the transmitting process, and the server 103 transmits the updated HTML file to the information processing apparatus 101. Accordingly, the HTML file is updated on the web browser 133, and the user can know change of the state of the server 103 based on displayed contents. As described above, the CPU 111 of the information processing apparatus 101 checks the completions of the scan process and the transmitting process by the web browser 133. Further, the CPU 111 displays the termination notice screen 1000 (see FIG. 12) that informs the user about the completions of the scan process and the transmitting process and the final content of the image information by the web browser 133.

The server 103 is not limited to the above-mentioned embodiment, and may perform the following processes. For example, the scan setting message received in the step S409 includes the generation conditions for the image information, such as resolution, a color mode, a sheet size, and a sheet number. Therefore, the transmission method in the step S407 may be determined based on the quantity of image information generated by the selected image input apparatus that is obtained by analyzing the content of the scan setting message.

In this case, the CPU 301 sets a reference value of the image information quantity beforehand, and determines the transmission method so that the image input apparatus directly transmits the image information to the server 103 when the image information quantity to be processed is beyond the reference value. On the other hand, the CPU 301 determines the transmission method so that the image input apparatus transmits the image information to the server 103 via the information processing apparatus 101 when the image information quantity to be processed is less than the reference value.

FIG. 7 is a flowchart showing an example of a process of the image input apparatus 102 in the scan process of the image input system. The CPU 202 of the image input apparatus 102 determines whether a network access arrived to the network I/F 205 from the exterior via the local network 104 (step S500), and waits until a network access arrives (NO in the step S500). When the network access arrives (YES in the step S500), the CPU 202 checks whether the content of the network access is a search command (step S501).

When it is a search command (YES in the step S501), the CPU 202 refers to the hardware information 221 saved in the external memory 220 and transmits a response to the information processing apparatus 101 (see the step S210 in FIG. 4A). Then, the CPU 202 returns the process to the step S500, and waits until the next network access arrives. When it is not a search command (NO in the step S501), the CPU 202 checks whether a scan job has been transmitted from the information processing apparatus 101 (step S503).

When a scan job does not arrive (NO in the step S5030), the CPU 202 returns the process to the step S500. When a scan job arrives (YES in the step S503), the CPU 202 executes the scan operation according to the scan job transmitted from the information processing apparatus 101 (see the step S244 in FIG. 4B), and generates image information (step S504).

Then, the CPU 202 transmits the image information (step S505) according to the decision result in the step S230 in FIG. 4B (the step S407 in FIG. 6A). When transmitting the image information through the route A, the CPU 202 connects with the destination URL of the server 103 instructed by the information processing apparatus 101 by the instructed transmitting protocol, and authenticates with the authentication ID included in the scan job. Then, the image information scanned when authentication was successful is transmitted.

On the other hand, when transmitting the image information through the route B, the CPU 202 transmits the image information to the scan script 328 currently executed by the information processing apparatus 101. In the information processing apparatus 101, the CPU 111 transfers the image information to the server by the scan script 328 while keeping the data contents using the transfer method (an IP header conversion process of a network packet etc.).

The transmission of the image information through the route A will be described below. The CPU 202 checks whether the transmission of the image information was completed by checking whether a termination command was received according to the response from the server 103 (step S506). When the termination command is not received within the fixed time period (NO in the step S506), the CPU 202 assumes to be timeout and performs an error handling (step S507). When the termination command is received within the fixed time (YES in the step S506), the CPU 202 terminates the scan process.

FIG. 13 is a schematic diagram showing contents of data transmission and reception and an example of the process when the search script 325 and the scan script 328 stored in the external memory 320 of the server 103 are executed by the web browser 133 of the information processing apparatus 101. In the image input system concerning this embodiment, an address of the server 103 that is connected to the Internet 107 by the network I/F 307 is "S". An address of the information processing apparatus 101 on the wireless communication network 106 connected via the first communication I/F 114 is "TI". An address of the information processing apparatus 101 on the local network 104 connected via the second communication I/F 119 is "TL". When the image input apparatus 102a is selected as an image input apparatus that generates and transmits image information, an address of the image input apparatus 102a on the local network 104 connected via the network I/F 205 is "D".

Packet data 1101 is one example of packet data that is transmitted from the server 103 to the search script (referred to as "the search script on the information processing apparatus 101", hereafter) 325 operating on the web browser 133 of the information processing apparatus 101 as a search message in the step S207 in FIG. 4A. The server 103 generates the packet data 1101 having a data structure that consists of a header and a payload including a search command etc. in a form transmitted via the local network 104. Then, the server 103 generates packet data that is transmitted to the address "TI" of the information processing apparatus 101 from the address "S" of the server 103 so that the packet data 1101 is included.

When receiving the packet data including the packet data 1101, the search script 325 of the information processing apparatus 101 extracts only the included packet data 1101, and transfer the packet data 1101 as packet data 1102 to the local network 104. A destination of the packet data 1102 in this case is "BC" so as to be broadcasted. The broadcasting of the search protocol in the step S208 described with reference to FIG. 4A is achieved by the extraction process of the data from the packet data by the search script 325 on the information processing apparatus 101.

Packet data 1103 that the image input apparatus 102a returns in response to the search command has a header to transmit from the address "D" of the image input apparatus 102a to the address "TL" of the information processing apparatus 101 on the local network 104. The payload of the packet data 1103 includes response information etc. including the hardware information 221.

When receiving the packet data 1103, the search script 325 on the information processing apparatus 101 generates packet data 1104 containing the packet data 1103. Then, the search script 325 on the information processing apparatus 101 transmits the packet data 1104 to the server 103 from the address "TI" via the wireless communication network 106. Thereby, the server 103 acquires the address "TL" of the information processing apparatus 101 on the local network 104, and the address "D" of the image input apparatus 102a that responded to the search command.

Packet data 1105 is one example of the scan job message used in the step S242 in FIG. 4B. The packet data 1105 has the similar data structure as the packet data 1101. That is, the server 103 generates the packet data 1105 having the data structure that consists of a header and a payload including a scan command etc. Then, the server 103 generates packet data that is transmitted to the address "TI" of the information processing apparatus 101 from the address "S" of the server 103 so that the packet data 1105 is included.

When receiving the packet data containing the packet data 1105, the scan script (referred to as "the scan script on the information processing apparatus 101", hereafter) 328 operating on the web browser 133 of the information processing apparatus 101 extracts only the packet data 1105. Then, the scan script 328 on the information processing apparatus 101 transfers the extracted packet data 1105 to the local network 104 as packet data 1106.

The server 103 generates the packet data 1105 using the address "TL" of the information processing apparatus 101 on the local network 104 and the address "D" of the image input apparatus 102a that responds to the search command that are acquired from the packet data 1104 etc. Therefore, the scan script 328 on the information processing apparatus 101 can generate the packet data that can be transmitted to the local network 104 by extracting the packet data part included routinely.

The image input apparatus 102a performs the scan operation according to the scan command, generates image information, and generates packet data 1107 that is transmitted to the information processing apparatus 101. The packet data 1107 has a header that directs to transmit data from the address "D" of the image input apparatus 102a to the address "TL" of the information processing apparatus 101 on the local network 104, and a payload thereof includes the image information etc.

When receiving the packet data 1107, the scan script 328 on the information processing apparatus 101 generates packet data 1108 containing the packet data 1107. Then, the scan script 328 on the information processing apparatus 101 transmits the packet data 1108 to the server 103 via the wireless communication network 106 and the Internet 107 from the address "TI".

It should be noted that the packet data 1107 is generated by dividing the image information according to the direction of the scan command. The scan script 328 sequentially processes packets equivalent to the packet data 1107 sent by a plurality of times so as to form the similar data structure as the packet data 1108, and transmits it to the server 103. Thereby, a sufficient response becomes possible even if the capacity of the RAM 112 used by the scan script 328 is insufficient.

Although an illustration and a detailed description are omitted, when a control of network port is required, a change of the network port may be written into a destination part of packet data together with an address if necessary. Correspondence becomes possible when the search script 325 and the scan script 328 generate packet data including the conversions, respectively.

The search script 325 and the scan script 328 of this embodiment can execute other functions. For example, the scan script 328 displays the scan setting screen 800 shown in FIG. 10, and transmits the information set by the user to the server 103 as a message. Since the search script 325 and the scan script 328 on the information processing apparatus 101 check the state of the server 103 periodically, they require the server 103 to update the display periodically. The server 103 can transmit the notification of error handling in the server 103 to the information processing apparatus 101 as a message when receiving the display update message, and the search script 325 and the scan script 328 can respond to the message.

As mentioned above, according to this embodiment, even if the information processing apparatus 101 like a cell phone is unsuitable for large-capacity-data transfer because of insufficient memory space, the image information with large capacity can be transmitted without passing through the information processing apparatus 101. This reduces the amount of information to be processed by the information processing apparatus 101, improves the performance, and reduces the communication load.

Although the embodiments of the invention have been described, the present invention is not limited to the above-mentioned embodiments, the present invention includes various modifications as long as the concept of the invention is not deviated. The embodiments mentioned above show examples of the present invention, and it is possible to combine the embodiments suitably.

For example, the communication between the server 103 and the image input apparatus 102 through the information processing apparatus 101 can be executed by any method as long as the methods can be executed by the information processing apparatus 101. For example, an ActiveX (registered trademark) control, a Java (registered trademark) script, a Java (registered trademark) applet, various plug-ins, etc. can be used. However, since the server 103 has choices of communication methods and there is a merit when the information processing apparatus 101 that does not need many functions is available, the priority among communication methods is determined. That is, it is efficient to use the communication method that can be executed on the information processing apparatus 101.

In the image input system, use of a two-way communication technique, such as the WebSockets (http://dev.w3.org/html5/WebSockets), is effective in order to enable a simple and efficient two-way communication. When the technique like the WebSockets is introduced, the search script 325 or the scan script 328 currently executed on the information processing apparatus 101 is not required to transmit the update message for the HTML file to the server 103 periodically. That is, the message from the server can be updated without a request from the information processing apparatus 101.

The notification of transmission etc. is also feasible by using the protocol defined by WS-Eventing or the GENA (General Event Notification Architecture) etc. The image input system of the present invention can employ any protocols as long as there is another method that gives the hardware information 221 suitably to the search script 325 operating on the information processing apparatus 101 and a similar result is obtained.

The above-mentioned embodiment adopts the system that the server 103 generates a scan job and transmits it to the image input apparatus 102. The present invention is not restricted to this. When the image input apparatus 102 is able to receive a scan job, the method of transmitting general-purpose information like a scan job ticket to the image input apparatus 102 may be used.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-123640, filed on Jun. 1, 2011, which is hereby incorporated by reference herein in its entirety.

What is claimed is:

1. An image input system comprising:
a server;
an information processing apparatus configured to communicate with said server via the Internet;
image input apparatuses configured to communicate with said information processing apparatus via a local network, and to communicate with said server via the Internet,
wherein said server comprises:
an acquisition unit configured to acquire transmission capacity information of said image input apparatuses searched by a search request from said information processing apparatus to search said image input apparatuses;
a selection unit configured to select a transmission route through which image information generated by an image input apparatus selected by said information processing apparatus from among said image input apparatuses searched, from among a first route that directly transmit image information to said server and a second route that transmit image information to said server via said image processing apparatus based on the transmission capacity information; and
a job message transmission unit configured to transmit a job message that makes the selected image input apparatus generate image information and execute transmission of the image information through the transmission route selected by said selection unit to said information processing apparatus,
wherein said information processing apparatus comprises:
a job transmission unit configured to transmit the job message to the image input apparatus selected as a job command,
wherein each of said image input apparatuses comprises:
an execution unit configured to generate the image information and to transmit it to said server according to the job command.

2. The image input system according to claim 1, wherein said server further comprises:
an analysis unit configured to analyze generation conditions for the image information in the image input apparatus selected by said information processing apparatus from among said image input apparatuses searched in order to generate the image information,
wherein said selection unit selects one of the first route and the second route based on the transmission capacity information of the image input apparatus selected when the amount of the image information transmitted from the image input apparatus selected based on the generation conditions is more than a predetermined reference value, and selects the second route when the amount of the image information is not more than the reference value.

3. The image input system according to claim 1, wherein said information processing apparatus further comprises:
a starting unit configured to start an image input service of said server;
a search request unit configured to download a search script for searching said image input apparatuses from said server, to execute the search script, and to transmit the search request to said server;
a transfer unit configured to transfer a search protocol transmitted from said server in response to the search request to the local network, and to transfer a response including the transmission capacity information from the image input apparatus that received the search protocol to said server;
a display unit configured to display a list of the image input apparatuses based on the response transmitted from said server;
a transmission unit configured to transmit information showing that the image input apparatus selected from among the image input apparatuses displayed in the list is used, to said server; and
a notification unit configured to download the scan script for setting the generation conditions for the image information in the image input apparatus selected from said server, to execute, and to notify said server of the set generation conditions for the image information,
wherein said server comprises:
a list transmission unit configured to generate the list based on responses of said image input apparatuses received from said information processing apparatus, and to transmit the list to said information processing apparatus.

4. The image input system according to claim 1, wherein said information processing apparatus comprises a user interface that displays states of the image input apparatus selected and said server.

5. A server that communicates with an information processing apparatus via a wireless communication network and the Internet, communicates with image input apparatuses via the Internet, and stores image information generated by the image input apparatuses, comprising:
an acquisition unit configured to acquire transmission capacity information of the image input apparatuses searched by a search request from the information processing apparatus to search the image input apparatuses;
a selection unit configured to select a transmission route through which image information generated by an image input apparatus selected by the information processing apparatus from among the image input apparatuses searched, from among a first route that directly transmit image information to the server and a second route that transmit image information to the server via the image processing apparatus based on the transmission capacity information; and
a job message transmission unit configured to transmit a job message that makes the selected image input apparatus generate the image information and execute transmission of the image information through the transmission route selected by said selection unit to the information processing apparatus.

6. A control method for a server that communicates with an information processing apparatus via a wireless communication network and the Internet, communicates with image input apparatuses via the Internet, and stores image information generated by the image input apparatuses, the control method comprising:
an acquisition step of acquiring transmission capacity information of the image input apparatuses searched by a search request from the information processing apparatus to search the image input apparatuses;
a selection step of selecting a transmission route through which image information generated by an image input apparatus selected by the information processing apparatus from among the image input apparatuses searched, from among a first route that directly transmit image information to the server and a second route that transmit image information to the server via the image processing apparatus based on the transmission capacity information; and a job message transmission step of transmitting a job message that makes the selected image input apparatus generate the image information and execute transmission of the image information through the transmission route selected by said selection unit to the information processing apparatus.

7. A non-transitory computer-readable storage medium storing a control program causing a computer to execute a control method for a server that communicates with an information processing apparatus via a wireless communication network and the Internet, communicates with image input apparatuses via the Internet, and stores image information generated by the image input apparatuses, the control method comprising:

an acquisition step of acquiring transmission capacity information of the image input apparatuses searched by a search request from the information processing apparatus to search the image input apparatuses;

a selection step of selecting a transmission route through which image information generated by an image input apparatus selected by the information processing apparatus from among the image input apparatuses searched, from among a first route that directly transmit image information to the server and a second route that transmit image information to the server via the image processing apparatus based on the transmission capacity information; and a job message transmission step of transmitting a job message that makes the selected image input apparatus generate the image information and execute transmission of the image information through the transmission route selected by said selection unit to the information processing apparatus.

* * * * *